(12) United States Patent
Fu et al.

(10) Patent No.: US 10,986,717 B1
(45) Date of Patent: Apr. 20, 2021

(54) REDUCED FALSE ALARMS FOR OUTDOOR IP SECURITY CAMERAS

(71) Applicant: Kuna Systems Corporation, San Bruno, CA (US)

(72) Inventors: Sai-Wai Fu, Los Altos, CA (US); Haomiao Huang, Redwood City, CA (US); Christopher Hiszpanski, San Francisco, CA (US); Amauri Campos Melo, Burlingame, CA (US)

(73) Assignee: KUNA SYSTEMS CORPORATION, San Bruno, CA (US)

( * ) Notice: Subject to any disclaimer, the term of this patent is extended or adjusted under 35 U.S.C. 154(b) by 87 days.

(21) Appl. No.: 15/659,873

(22) Filed: Jul. 26, 2017

Related U.S. Application Data

(63) Continuation of application No. 15/611,975, filed on Jun. 2, 2017, now Pat. No. 10,117,309, and a continuation of application No. 15/593,570, filed on May 12, 2017, now Pat. No. 10,462,341, and a continuation of application No. 15/498,866, filed on Apr. 27, 2017, now Pat. No. 10,136,037, and a continuation of application No. 15/214,866, filed on Jul. 20, 2016, now Pat. No. 9,992,389, said application No. 15/611,975 is a continuation of application No. 14/881,275, filed on Oct. 13, 2015, now abandoned, which is a continuation of application No. 14/859,867, filed on Sep. 21, 2015, now Pat. No. 9,654,678, which is a continuation of
(Continued)

(51) Int. Cl.
*H05B 47/11* (2020.01)
*H04N 5/232* (2006.01)

(52) U.S. Cl.
CPC ......... *H05B 47/11* (2020.01); *H04N 5/23206* (2013.01)

(58) Field of Classification Search
CPC ............ H05B 37/0218; H04N 5/23206; G08B 13/19619
USPC ........................................................ 348/143
See application file for complete search history.

(56) References Cited

U.S. PATENT DOCUMENTS

| | | | | |
|---|---|---|---|---|
| 5,774,576 A | * | 6/1998 | Cox ..................... | G06K 9/6215 382/118 |
| 6,421,080 B1 | * | 7/2002 | Lambert ................ | H04N 7/181 348/143 |
| 6,824,317 B2 | * | 11/2004 | Finizio ............... | G08B 13/1965 396/427 |
| 8,325,036 B1 | * | 12/2012 | Fuhr ................ | G08B 13/19613 340/540 |

(Continued)

*Primary Examiner* — Joseph G Ustaris
*Assistant Examiner* — Jimmy S Lee
(74) *Attorney, Agent, or Firm* — Christopher P. Maiorana, PC

(57) ABSTRACT

An apparatus comprising a camera sensor and a processor. The camera sensor may be configured to generate video data of an area of interest. The processor may be configured to (A) analyze the video data, (B) generate control signals and (C) adjust a status of a plurality of security responses. The control signals may be generated in response to (a) the analysis of the video data and (b) the status of the security responses. The control signals may adjust an activation of the security responses. A first of the security responses may be activated in response to an event detected by the analysis of the video data. A first communication to a first contact may be initiated based on the analysis of the video data of the event. A second communication to a second contact may be initiated based on a response to the first communication.

20 Claims, 10 Drawing Sheets

Related U.S. Application Data application No. 14/664,275, filed on Mar. 20, 2015, now Pat. No. 9,726,338, and a continuation of application No. 14/519,642, filed on Oct. 21, 2014, now Pat. No. 10,289,917, and a continuation of application No. 14/504,632, filed on Oct. 2, 2014, now abandoned, and a continuation of application No. 14/205,946, filed on Mar. 12, 2014, now Pat. No. 9,542,832, and a continuation of application No. 14/164,540, filed on Jan. 27, 2014, now Pat. No. 9,143,741, which is a continuation-in-part of application No. 13/921,597, filed on Jun. 19, 2013, now Pat. No. 9,172,917.

(60) Provisional application No. 62/461,947, filed on Feb. 22, 2017, provisional application No. 62/393,922, filed on Sep. 13, 2016, provisional application No. 62/367,747, filed on Jul. 28, 2016, provisional application No. 62/335,827, filed on May 13, 2016, provisional application No. 62/328,827, filed on Apr. 28, 2016, provisional application No. 62/197,322, filed on Jul. 27, 2015, provisional application No. 62/166,968, filed on May 27, 2015, provisional application No. 61/923,931, filed on Jan. 6, 2014, provisional application No. 61/902,943, filed on Nov. 12, 2013, provisional application No. 61/790,865, filed on Mar. 15, 2013, provisional application No. 61/783,474, filed on Mar. 14, 2013, provisional application No. 61/783,565, filed on Mar. 14, 2013, provisional application No. 61/684,310, filed on Aug. 17, 2012.

(56) References Cited

U.S. PATENT DOCUMENTS

| Patent/Pub No. | Date | Inventor | Classification |
|---|---|---|---|
| 8,520,068 B2* | 8/2013 | Naidoo | G08B 13/19658 348/143 |
| 8,675,066 B2* | 3/2014 | Trundle | G08B 13/196 348/143 |
| 8,789,093 B2* | 7/2014 | Medina | H04N 5/23206 725/37 |
| 8,937,658 B2* | 1/2015 | Hicks, III | G08B 19/005 348/143 |
| 9,176,485 B2* | 11/2015 | Krumm | G06N 7/005 |
| 9,275,424 B2* | 3/2016 | Caskey | G16H 20/70 |
| 2003/0197807 A1* | 10/2003 | Wu | 348/375 |
| 2006/0045185 A1* | 3/2006 | Kiryati | G08B 13/19608 375/240.16 |
| 2006/0204057 A1* | 9/2006 | Steinberg | G06K 9/00248 382/118 |
| 2007/0090944 A1* | 4/2007 | Du Breuil | G08B 25/009 340/531 |
| 2009/0141939 A1* | 6/2009 | Chambers | G06K 9/00771 382/103 |
| 2009/0262189 A1* | 10/2009 | Marman | G08B 13/19613 348/143 |
| 2011/0052000 A1* | 3/2011 | Cobb | G06T 7/246 382/103 |
| 2011/0063440 A1* | 3/2011 | Neustaedter | H04N 7/147 348/143 |
| 2012/0232954 A1* | 9/2012 | Calman | G06Q 30/0625 705/7.32 |
| 2012/0262575 A1* | 10/2012 | Champagne | G08B 13/19613 348/143 |

\* cited by examiner

REDUCED FALSE ALARMS FOR OUTDOOR IP SECURITY CAMERAS

This application relates to U.S. Provisional Application No. 62/367,747, filed Jul. 28, 2016. This application also relates to U.S. Ser. No. 15/611,975, filed Jun. 2, 2017, which relates to U.S. Ser. No. 14/881,275, filed Oct. 13, 2015, which relates to U.S. Ser. No. 14/859,867, filed Sep. 21, 2015, now U.S. Pat. No. 9,654,678, which relates to U.S. Ser. No. 14/164,540, filed Jan. 27, 2014, Now U.S. Pat. No. 9,143,741, which relates to U.S. Ser. No. 13/921,597, filed Jun. 19, 2013, now U.S. Pat. No. 9,172,917, which relates to (i) U.S. Provisional Application No. 61/790,865, filed Mar. 15, 2013, (ii) U.S. Provisional Application No. 61/783,474, filed Mar. 14, 2013, and (iii) U.S. Provisional Application No. 61/684,310, filed Aug. 17, 2012. U.S. Ser. No. 14/164,540, filed Jan. 27, 2014 also relates to U.S. Provisional Application No. 61/923,931, filed Jan. 6, 2014. U.S. Ser. No. 14/859,867, filed Sep. 21, 2015 also relates to U.S. Ser. No. 14/205,946, filed Mar. 12, 2014, now U.S. Pat. No. 9,542,832, which relates to U.S. Provisional Application No. 61/783,565, filed Mar. 14, 2013. U.S. Ser. No. 14/859,867, filed Sep. 21, 2015 also relates to U.S. Ser. No. 14/519,642, filed Oct. 21, 2014, which relates to U.S. Provisional Application No. 61/902,943, filed Nov. 12, 2013. U.S. Ser. No. 14/859,867, filed Sep. 21, 2015 also relates to U.S. Ser. No. 14/504,632, filed Oct. 2, 2014. U.S. Ser. No. 14/859,867, filed Sep. 21, 2015 also relates to U.S. application Ser. No. 14/664,275, filed Mar. 20, 2015. U.S. Ser. No. 14/859,867, filed Sep. 21, 2015 also relates to U.S. Provisional Application No. 62/166,968, filed May 27, 2015. This application also relates to U.S. Ser. No. 15/214,866, filed Jul. 20, 2016, which relates to U.S. Provisional Application No. 62/197,322, filed Jul. 27, 2015. This application also relates to U.S. Ser. No. 15/498,866, filed Apr. 27, 2017, which relates to U.S. Provisional Application No. 62/328,827, filed Apr. 28, 2016. This application also relates to U.S. Ser. No. 15/593,570, filed May 12, 2017, which relates to U.S. Provisional Application No. 62/335,827, filed May 13, 2016. This application also relates to U.S. Provisional Application No. 62/393,922, filed Sep. 13, 2016. This application also relates to U.S. Provisional Application No. 62/461,947, filed Feb. 22, 2017. Each of the mentioned applications are hereby incorporated by reference in their entirety.

FIELD OF THE INVENTION

The invention relates to security cameras generally and, more particularly, to a method and/or apparatus for implementing reduced false alarms for outdoor IP security cameras.

BACKGROUND

Conventional solutions for home monitoring include an indoor alarm monitoring service (i.e., the conventional alarm service company ADT). Conventional home monitoring services have been a healthy market (i.e., $17B) in the US for many years. In terms of user experience, conventional home monitoring services can be described in 4 steps. The first step is for the user to manually arm and disarm a control panel inside the home. The second step is to detect an intruder in the home using basic sensors (i.e., door sensors, window sensors and PIR motion sensors). If the system is armed and an intruder is detected, the third step is to send an alarm signal to a central monitoring service. The central monitoring service will then contact the homeowner by phone to ask for a decision on whether the police should be contacted. The fourth step is for the homeowner to make the decision with the help of the personnel of the monitoring service.

In each of these 4 steps of the conventional home monitoring service, there is a significant disadvantage. In the first step, the manual arming and disarming of the monitoring service is a daily chore that often creates false alarms or results in users not arming the system. In the second step, if an intruder is inside the home and is detected by the sensors, the intruder knows they have about 10 minutes to steal and leave before there is a response. In the third step, the alarm signal is usually a false alarm caused by a visitor unfamiliar with the control panel. For the homeowner, it is a stressful experience to make the decision on what to do next based on a simple alarm signal. The fourth step is the most concerning when 98% of the visits by the police are due to false alarms.

It would be desirable to implement reduced false alarms for outdoor IP security cameras.

SUMMARY

The invention concerns an apparatus comprising a camera sensor and a processor. The camera sensor may be configured to generate video data of an area of interest. The processor may be configured to (A) analyze the video data, (B) generate control signals and (C) adjust a status of a plurality of security responses. The control signals may be generated in response to (a) the analysis of the video data and (b) the status of the security responses. The control signals may adjust an activation of the security responses. A first of the security responses may be activated in response to an event detected by the analysis of the video data. A first communication to a first contact may be initiated based on the analysis of the video data of the event. A second communication to a second contact may be initiated based on a response to the first communication.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing reduced false alarms for outdoor IP security cameras that may (i) generate automatic greetings, (ii) arm/disarm security responses based on a timing system, (iii) monitor an area of interest, (iv) integrate with third-party security services, (v) implement machine learning to classify a type of visitor, (vi) store video loops, (vii) communicate video data to a contact to confirm a potential threat, (viii) deter intruders before they break in and/or (ix) be implemented as one or more integrated circuits.

Embodiments of the present invention may provide an outdoor monitoring service (e.g., a "doorman service") using a wireless IP security camera that is complementary to conventional indoor alarm monitoring services. The present invention may be implemented to monitor an area of interest to prevent bad things (e.g., bad events) from happening (e.g., a thief trying to steal a delivered package, a burglar looking for a house to break into, a solicitor, etc.). By implementing a wireless IP security camera with a professional monitoring service, the value to a user is much higher than just providing the basic tools for self-monitoring or just providing an indoor alarm monitoring service. A wireless IP security camera may be implemented as an outdoor security camera configured to detect a visitor (e.g., a potential threat) before the bad event occurs. Embodiments of the invention may provide a reduction of a number of false alarms sent to a monitoring service and/or authorities by providing an option to confirm a potential threat before alerts are sent to third parties.

Figure 1:
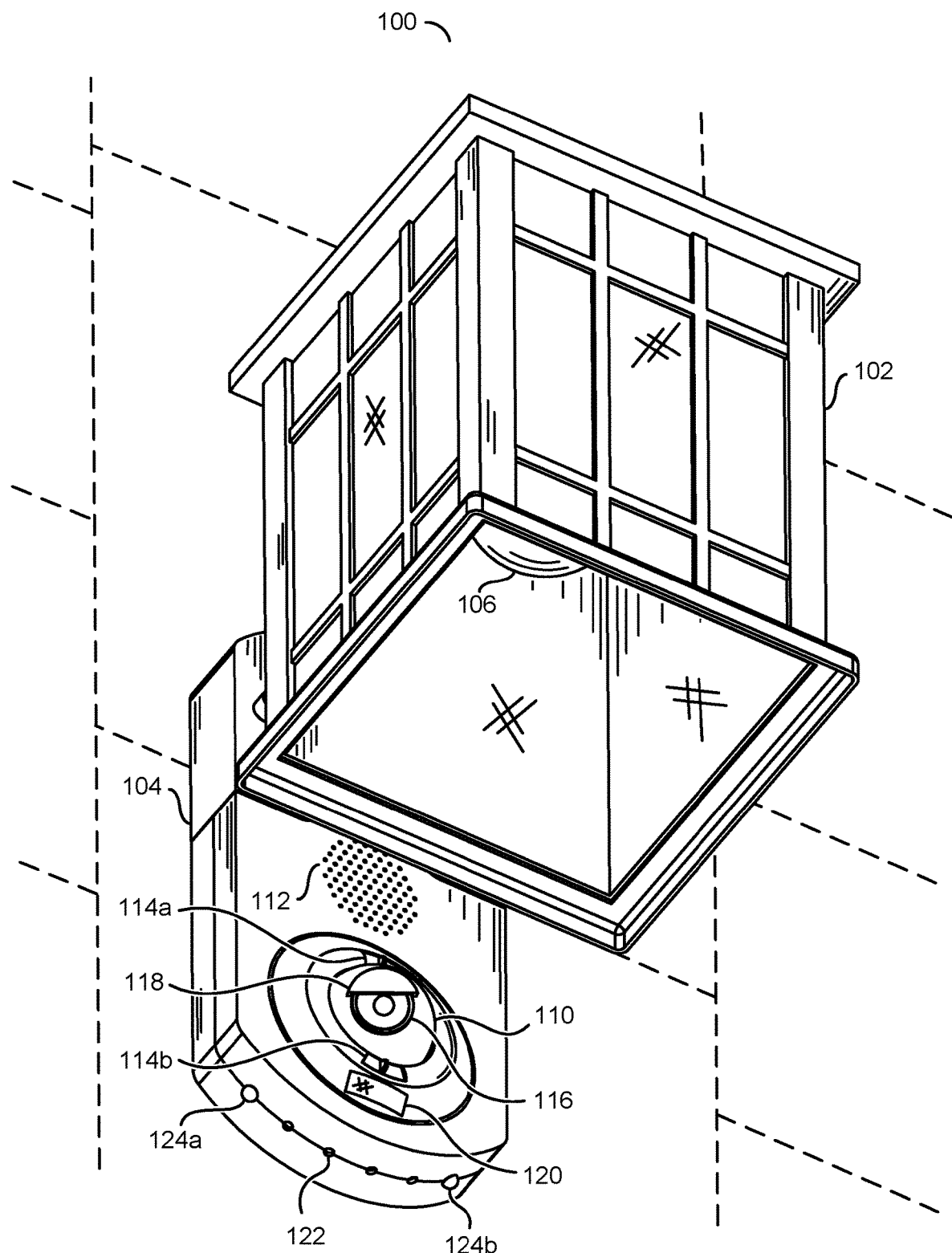
FIG. 1 is a diagram illustrating a security light implementing an embodiment of the present invention.

Referring to FIG. 1, a diagram illustrating a security light 100 implementing an embodiment of the present invention is shown. The security light 100 may be a smart security IP camera. The smart security light 100 may comprise a light shade 102 and the base 104. The base 104 may comprise a lens module 110, a speaker grille 112, adjustment grips 114a-114b, an IR sensor lens 120, a microphone grille 122, and indicator LEDs 124a-124b. The lens module 110 may comprise a lens 116 and a lens cover 118.

The smart security light 100 may further optionally comprise a light bulb 106. The light bulb 106 may be replaceable. The light bulb 106 may be implemented using an incandescent light bulb, a compact fluorescent lamp (CFL) bulb and/or an LED bulb. The type and/or style of the light bulb 106 may be varied according to the design criteria of a particular implementation.

The smart security light 100 may be implemented as a light fixture. The smart security light fixture 100 may be configured to mount to a wall and/or ceiling mount. The smart security light fixture 100 may be configured to connect to existing electrical wiring. For example, the smart security light fixture 100 may be mounted to an electrical box (e.g., a junction box) that provides wiring to the electrical system of a premises.

The lens module 110 may be configured to capture video data. For example, the lens module 110 may implement a high resolution and/or high definition (e.g., 720p, 1080i, 1080p, 4k, etc.) video camera. The video data may be high-resolution video frames and/or audio data. The quality of the video data may be varied according to the design criteria of a particular implementation. Generally, the quality of the video data is enough (e.g., has a high enough resolution, has sufficient visual quality, etc.) to support object detection (e.g., facial recognition, motion detection, object identification, tagging, etc.).

Figure 2:
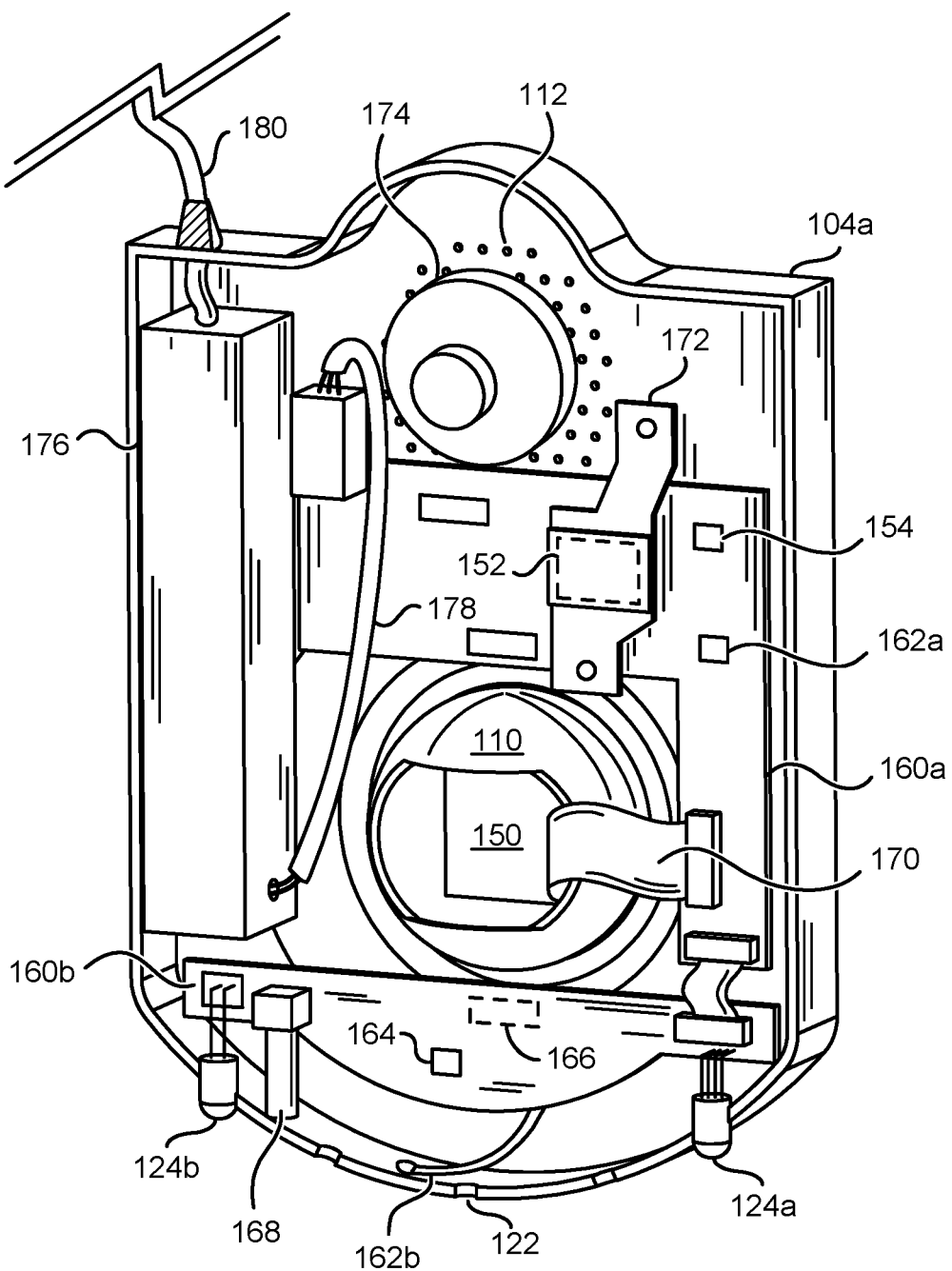
FIG. 2 is a diagram illustrating a rear view of the internal components of a security light implementing an embodiment of the present invention.

Referring to FIG. 2, a rear view of the internal components of the security light 100 implementing an embodiment of the present invention is shown. A backside of a front portion 104a of the base 104 is shown. A camera sensor 150 is shown in the lens module 110. A processor 152 is shown. Circuit boards 160a-160b are shown. In an example, the circuit board 160a may be a processor module. A memory 154 is shown on the circuit board 160a.

The circuit board 160a is shown as an L-shape (e.g., configured to fit around the lens module 110). The circuit board 160a is shown comprising the processor 152 and a communication module 162a. For example, the communication module 162a may be a Wi-Fi circuit. The communication module 162a may be connected to an antenna 162b. For example, the antenna 162b may be a flexible Wi-Fi antenna. The Wi-Fi antenna 162b may be held in place (e.g., glued) to a bottom of the base 104. The circuit board 160a may comprise other internal components of the light fixture 100. For example, the circuit board 160a may comprise a Bluetooth antenna (e.g., a Bluetooth antenna may be positioned on the other side of the circuit board 160a).

The circuit board 160b is shown connected to the circuit board 160a. The circuit board 160b is shown connected to a microphone 164, an IR sensor 166, the indicator LEDs 124a-124b and a reset button 168. The arrangement of the components and/or the type of components of the circuit board 160b may be varied according to the design criteria of a particular implementation.

The lens module 110 is shown having an opening. The opening may allow a cable 170 to connect the camera sensor 150 to the circuit board 160a. The cable 170 may be configured to transmit the video data captured by the camera sensor 150. For example, the cable 170 may be a high-speed, low-noise flexible cable. The circuit board 160a may transmit the video data from the cable 170 to the processor 152.

The processor 152 is shown under a heatsink 172. A speaker 174 is shown connected to the circuit board 160a. A power adapter 176 is shown connected to the processor module 160a. A cable 178 is shown connecting the power adapter 176 to the processor module 160a. The cable 178 may transmit supply power converted by the power adapter 176 to the processor module 160a (and the lens module 110). The cable 178 may transmit the control signals from the processor 152 to the power supply 176. For example, the cable 178 may transmit DC signals between the power supply 176 and the circuit boards 160a-160b. The power adapter 176 may convert the control signals from the processor 152 to be compatible with the light bulb 102 and/or other external devices such as security response devices. For example, the power adapter 176 may convert external power received from a cable 180 to provide power to the circuit boards 160a-160b via the cable 178. In another example, the power adapter 176 may convert signals received from the circuit boards 160a-160b via the cable 178 to provide power to external devices such as the security response devices via the cable 180.

The communication module 162 may be configured to connect to a local network and/or a wide area network (e.g., the internet). In some embodiments, the communication module 162 may be configured to implement one or more types of communications protocols. For example, the communication module 162 may support a Wi-Fi connection and/or a Bluetooth connection. In some embodiments, the communication module 162 may be distributed as multiple circuits on the circuit boards 160a-160b (e.g., a processing chip for each communications protocol). Other types of communications protocols may be implemented according to the design criteria of a particular implementation. In some embodiments, the communication module 162 may implement the Bluetooth connection to connect to a user device (e.g., a smartphone, a tablet computing device, a phablet, a smart watch, a portable computer, a desktop computer, etc.) to provide an interface for configuring the light fixture 100 (e.g., to allow the user to input local network settings). In some embodiments, the communication module 162 may implement the Wi-Fi connection to connect to a cloud service via the internet. In some embodiments, the communication module 162 may implement various types of short-range communication (e.g., Z-Wave, RFID, point-to-point communication, etc.).

In some embodiments, the smart light fixture 100 may be configured to upload data (e.g., the captured video data) to the cloud service. For example, the data uploaded to the cloud service may be streamed to the user device. The user device may connect to the cloud service to allow the user to request the stored video data. For example, the video data may be sent to the user device as a live (or nearly live) video stream. The data traffic to/from the cloud services may be encrypted (e.g., AES 128-bit encryption, AES 256-bit encryption, etc.). User account passwords may be salted and hashed with a cryptographic hash function.

In some embodiments, the smart security light fixture 100 may store the captured video data (e.g., in the memory 154). In some embodiments, the video data may be uploaded to the cloud service. Generally, the cloud service and/or the memory 154 may have a limited storage capacity. In some embodiments, the light fixture 100 may analyze the captured video data (e.g., using the processor 152) and/or data from the IR sensor 166 to perform a particular type of detection. For example, the light fixture 100 may detect objects, motion and/or visitors within in an area of interest. The smart security light fixture 100 may initiate storage of the video data in response to the particular type of detection. The detection performed by the smart security light fixture 100 may be used to detect objects approaching the premises.

Figure 3:
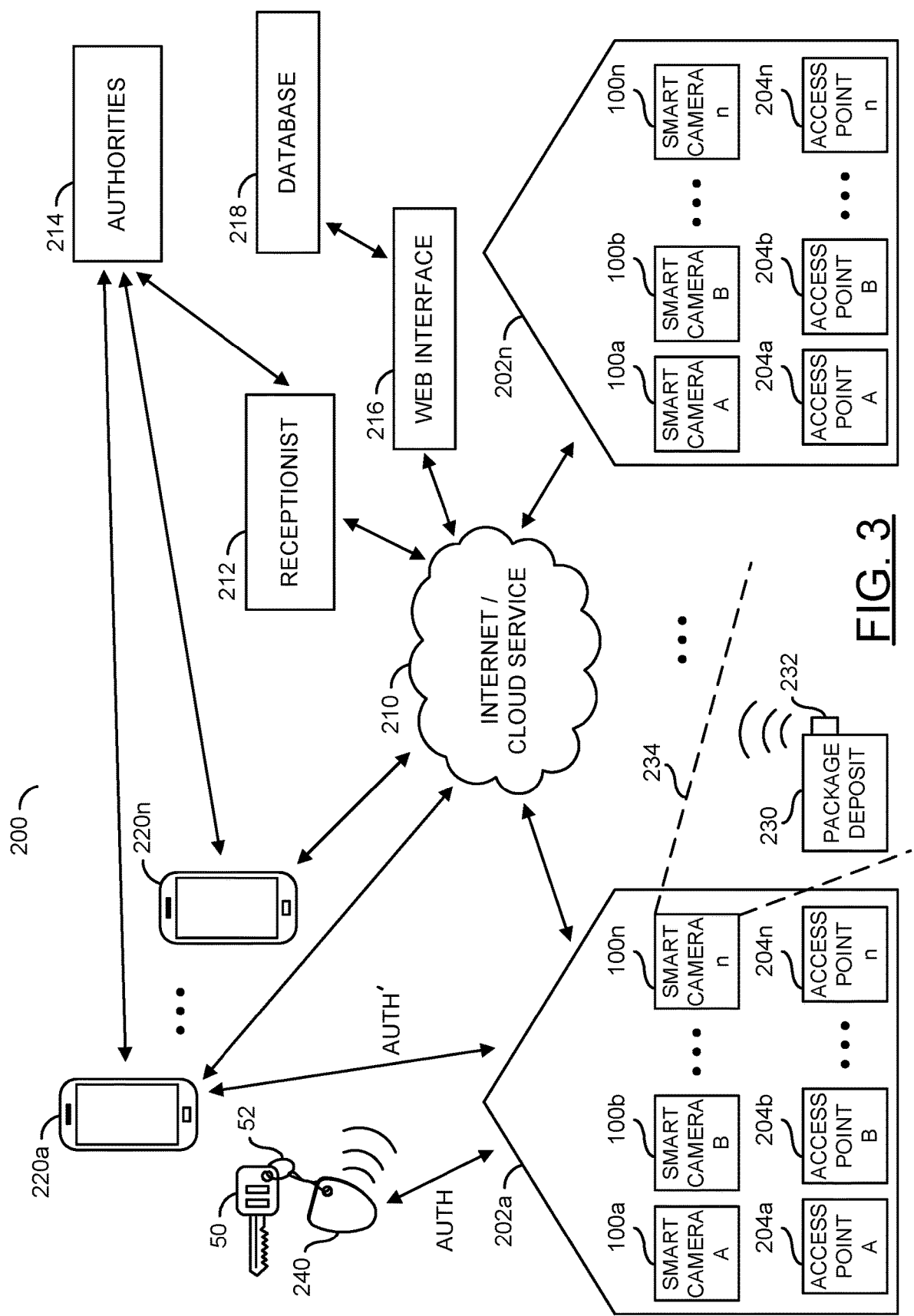
FIG. 3 is a diagram illustrating an example cloud-based security system.

Referring to FIG. 3, a diagram illustrating an example cloud-based security system 200 is shown. The system 200 generally comprises blocks 202a-202n. The blocks 202a-202n may be homes and/or business premises. Each of the homes 202a-202n may comprise blocks 204a-204n. The blocks 204a-204n may be areas of interest (e.g., access points to the homes and/or business premises 202a-202n). The smart security lights 100a-100n may be set up at each of the areas of interest 204a-204n of the homes and/or business premises 202a-202n. For example, the smart security lights 100a-100n may be configured to monitor the areas of interest 204a-204n.

The system 200 may further comprise the internet and/or cloud service 210, a receptionist 212, authorities 214, a web interface 216, a database 218 and/or blocks (or circuits) 220a-220n. The circuits 220a-220n may be the user devices. In an example, the user devices 220a-220n may be smartphones and/or other personal computing devices. In one example, the receptionist 212 may be a virtual receptionist. In another example, the receptionist 212 may be a person from a central monitoring service (e.g., a professional home security service). In one example, the authorities 214 may be the police department, the fire department, an ambulance, and/or other emergency services.

The areas of interest 204a-204n may be doors, windows, garages, other entrances, and/or vantage points. Generally, the smart cameras 100a-100n may be mounted at the areas of interest 204a-204n. Data from the smart cameras 100a-100n at the homes and/or business premises 202a-202n may be sent to the internet and/or cloud service 210.

Data sent to the Internet and/or cloud service 210 may be sent to the user devices 220a-220n. For example, an alert from one of the smart cameras 100a-100n from the home 202a may be sent to the device 220a of the homeowner indicating that another family member has arrived home. In another example, an alert from one of the smart cameras 100a-100n from the home 202n may be sent to the smartphone 220c of an owner of another home (e.g., the owner of the home 202b) that a suspicious person has been identified in the neighborhood. A user may then send a notification to the authorities 214. A user of the user devices 220a-220n may send data back to the smart cameras 100a-100n of the homes and/or business premises 202a-202n through the internet and/or cloud service 210. In one example, a homeowner may send a command to arm an alarm (e.g., one of the security responses) at their home.

In one example, the user devices 220a-220n may be in the possession of trusted volunteers. The trusted volunteers may be other home owners in the system 200. The trusted volunteers may be the first line of response to a security issue detected by the system 200. Alerts by the system 200 may be sent in parallel to all the trusted volunteers. The trusted volunteers may use available communication channels provided such as cell phones, telephone and/or emails. The homeowner may advise particular pre-defined responses to particular alerts such as calling the authorities 214 (e.g., the police and/or the fire department). The trusted volunteers may be able to activate a set of pre-defined actions using the user devices 220a-220n. The trusted volunteers may take training sessions to learn how to properly respond to various alerts. The training sessions may be taken on-line. The on-line training sessions may be available on the web interface 216.

If the network of trusted neighbors 202a-202n has the same system, they may exchange images, video, and/or other information of unwelcomed visitors. The website and/or web interface 216 may have the database 218 to manage the images, video, and/or other information. Unwelcome visitors stored in the database 218 may be shared with other neighbors and/or the authorities 214 using the web interface 216. For example, when the unwelcomed visitors learn about the database 218 they may not target the neighborhood 202a-202n. Data in the database 218 may be used to classify types of visitors (e.g., comparisons may be performed between the captured video data and information in the database 218).

Multiple levels of alerts may be implemented to distinguish unwelcomed visitors from welcomed visitors (e.g., household members). Since most visitors may be welcomed, identifying strangers and raising the level of alert for immediate attention may be important. The technology to identify and/or classify welcomed visitors may include facial recognition, voice recognition, machine learning of habits (e.g., behaviors) and schedules of household members, and/or user inputs when errors occur. Learned behavior may be used to determine which pre-defined function to perform. For example, the learned behavior may determine that nobody is home at a particular time, and the pre-defined function may be to automatically arm the security system and/or perform energy saving functions (e.g., adjust the heating and/or cooling of a home). In another example, the daily schedule of inhabitants may be observed and/or recorded.

The daily schedule of inhabitants may be learned using various sensors. For example, patterns may be observed such as daily energy use requirements at a certain time of day and/or the arming/disarming of a security system. In another example, smart lighting may estimate the amount of lighting needed at a particular time of day based on the occupants in a home. If nobody is home, the system 200 may determine that exterior lighting is needed and/or interior lighting is not needed. In another example, if a family is on vacation the system may turn on interior lighting to make it appear to a potential burglar that the home is occupied. The learned behavior may develop a unified status of the home (e.g., based on occupancy, time of day, weather, security status, etc.). Pre-defined functions may be performed based on the unified status of the home.

In some embodiments, the smart security light fixture 100 may initiate storage of the video data in response to motion detection in the area of interest. The user device 220a (e.g., a smart phone) may be used to allow a user to set a motion threshold for the smart security light fixture 100. For example, a lower motion threshold may be more sensitive to motion. In another example, a higher motion threshold may be less sensitive to motion (e.g., reduce a number of false positives). The motion threshold may be adjustable.

In some embodiments, the smart security light fixture 100 may initiate storage of the video data in response to detecting and/or locating a person (e.g., a visitor) and/or other type of object in the video data. In one example, the smart security light fixture 100 may analyze the video data to detect people and/or animals. In some embodiments, facial recognition may be implemented to classify and/or recognize visitors. The activation state may be selected based on the classification. In some embodiments, the video data may be analyzed to determine a behavior of the visitors. For example, the video data may be analyzed and compared to motion patterns and/or sequences of motions stored in the database 218.

In some embodiments, machine learning techniques may be implemented to improve detection and/or classification accuracy of visitors, objects and/or events. In general, a machine learning technique is a process performed by the processor 152 and/or distributed processing provided by the cloud services 210 without being instructed by a person. A machine learning process may implement a feedback loop. The feedback loop may be used to adjust weighting factors and/or scaling factors to enable the machine learning technique to self-correct and/or approach a correct solution in future iterations. For example, when a correct and/or accurate decision is made by the machine learning technique, positive feedback may be returned to reinforce the classification. In another example, when an incorrect and/or inaccurate decision is made by the machine learning technique, negative feedback may be returned to reduce a likelihood of the machine learning technique of making a similar decision.

Generally, an accuracy of decisions by a machine learning technique improves over time and/or as additional information and feedback is provided. For example, the user may be able to provide a correct and/or incorrect label to a detection performed by the smart security light fixture 100. If the detection and/or classification is incorrect, the incorrect label may be used by the smart security light fixture 100 to incorporate an incorrect result of the detection into the machine learning techniques. In some embodiments, the machine learning techniques may be implemented in the cloud service (e.g., the analysis is performed using cloud computing resources). Video data and/or correct/incorrect labels may be uploaded and/or stored anonymously (e.g., without personal identification information). The smart security light fixture 100 may be configured to ignore (e.g., not respond to, not track and/or not send notifications in response to) small animals and/or shadows.

In some embodiments, the smart security light fixture 100 may be configured to send notifications to the user devices 220a-220n in response to the detection. For example, a text message and/or an email may be transmitted in response to the notification. In another example, a notification may be sent via an API (e.g., push notifications) for a particular operating system (e.g., Android notifications, iOS notifications, Windows notifications, etc.). Generally, the user may create a user account (e.g., comprising at least an email address and a password as credentials) for the cloud service (e.g., via an app and/or the web-based interface 216). The user account may allow the user to configure preferences. The preferences may comprise the notification settings. The type of notifications sent by the smart security light fixture 100 may be based on the notification settings. The smart security light 100 may implement the activation states and/or arm/disarm the security responses to limit a number of the notifications sent. Intelligently limiting the number of notifications sent may reduce a number of false alarms and/or reduce an amount of data transferred via the network 210 (e.g., prevent QoS issues and/or dropped data).

The cloud service 210 and/or the database 218 may store portions of the video data. For example, portions of the video data may be saved in response to the particular types of detections. The portions of video data may be video clips (e.g., files) processed by the processor 152. The video clips may be encoded and/or compressed by the processor 152 to reduce a size of storage capacity of the video clips. The video clips may have a limited video length (e.g., 30 seconds, one minute, 90 seconds, five minutes, etc.). The length of the video clips may be based on the configuration preferences and/or in response to the detections by the light fixture 100 (e.g., a longer video clip may result in response to continuous detections). In some embodiments, the video clips may be pre-padded and/or post-padded with video data before and/or after the detection. For example, the video clip may store video data from a pre-determined time before and/or after the detection (e.g., 30 seconds before the detection and/or 30 seconds after the detection for a video clip approximately one minute long).

In some embodiments, a user interface may be provided for the user devices 220a-220n (e.g., an app, an executable program, the web-based interface 216, etc.). The user interface may allow one or more of the user devices 220a-220n to control various components of the light fixture 100. For example, one or more user devices 220a-220n may be configured to access the user account. The control signals may be generated in response to the input from the user devices 220a-220n. For example, an icon may be provided on the user interface representing a light bulb. The user may activate and/or deactivate the light bulb 102 by pressing (touching on a touchscreen, clicking, etc.) the icon.

Other components such as security response components may be turned on and/or off from the user interface. For example, icons may be provided to allow the user to control the speaker 174. In one example, the speaker 174 may playback a pre-recorded audio message (e.g., the user may select from one or more pre-recorded audio messages on the user interface to enable an automated message). In another example, the speaker 174 may sound an alarm (e.g., one or more alarm types may be selected from the user interface).

In some embodiments, the light fixture 100 may be configured for two-way audio communications (e.g., an intercom). For example, a visitor may speak through the microphone 164. The microphone 164 may receive the audio data. The communication module 162 may transmit the received audio to one or more of the user devices 220a-220n. The user devices 220a-220n may playback the audio to the user. The user may speak via the user devices 220a-220n. The user devices 220a-220n may transmit the audio to the light fixture 100 via the communication module 162 (e.g., a Wi-Fi connection). The speaker 174 may transmit and/or stream the received audio.

The light fixture 100 may provide various APIs (application programming interface) to connect with other devices (e.g., other home automation devices). For example, the APIs may allow various other devices to communicate with the light fixture 100. The light fixture 100 may generate control signals based on the communication with the various other devices. The types of APIs available may be varied according to the design criteria of a particular implementation.

A package deposit 230 is shown at the home 202a. The package deposit 230 may be implemented to allow the visitor to deliver packages. The package deposit 230 may be implemented as a container, a bag, a delivery slot, a mailbox, etc. In an example, the package deposit 230 may be implemented as a large net with a zipper and a lock. A delivery person may be instructed by the smart security light 100 to place a package inside the package deposit 230 and zip up and/or lock the package deposit 230. In some embodiments, the package deposit 230 may implement a hazardous waste storage (e.g., medical waste for a medical facility) and the package deposit 230 may be monitored to ensure proper disposal of materials in the package deposit 230 (e.g., the package deposit 230 may be implemented for package pick-up). The implementation of the package deposit 230 may be varied according to the design criteria of a particular implementation.

A wireless device 232 is shown on the package deposit 230. The wireless device 232 may be configured to transmit wireless signals to indicate a status of the package deposit 230. In an example, the wireless device 232 may send a notification to the security light 100 indicating that the package has been delivered. In another example, the wireless device 232 may be configured to send a notification to the security light 100 indicating that the package deposit 230 has been tampered with. The smart security light 100 may forward the notification to one or more of the user devices 220a-220n. The type of notifications transmitted by the wireless device 232 may be varied according to the design criteria of a particular implementation.

The smart security light 100 may be configured to adjust the activation state in response to the package being delivered and/or picked up (e.g., in response to the notification from the wireless device 232). A security zone 234 is shown. The smart security camera 100n may monitor the security zone 234 near the package deposit 230. In an example, when the security zone 234 is invaded (e.g., by a visitor such as a potential package thief) the smart security light 100 may be configured to perform a security response (e.g., activate an alarm, send an alert to a designated user, etc.). The security zone 234 may be the area of interest of the smart security light 100n. In some embodiments, the security zone 234 may correspond to the areas of interest 204a-204n.

A block (or circuit) 240 is shown. The circuit 240 may implement an identification device. For example, the identification device 240 may implement a wireless identification (ID). The wireless ID device 240 is shown connected to keys 50 and/or a keychain 52. Details of the wireless ID device 240 may be described in association with FIG. 4.

The communications module 162 may be configured to communicate with one or more of the smartphones 220a-220n and/or the wireless ID device 240 using a local connection (e.g., without connecting through the internet 210). The wireless ID device 240 is shown communicating with the smart security lights 100a-100n. In an example, the communication between the wireless ID device 240 and the smart security lights 100a-100n may be a Bluetooth Low-Energy (BLE) connection. The smartphone 220a is shown communicating with the smart security lights 100a-100n. The communication between the wireless ID device 240, the smartphones 220a-220n and/or the smart cameras 100a-100n may have a similar implementation as the wireless device 232.

In one example, the communication between the smartphone 220a and the smart security lights 100a-100n may be a geolocation signal (e.g., sent via Wi-Fi). The wireless ID device 240 may send/receive a signal (e.g., AUTH). The smartphone 220a may send/receive a signal (e.g., AUTH'). The signals AUTH and/or AUTH' may be an identification and/or authentication signal.

In some embodiments, the smart security lights 100a-100n may be configured to prevent (e.g., disable) sending and/or generating notifications to a user, recording and/or transmitting video data and/or particular security responses based on the detection of the signal AUTH and/or the signal AUTH'. In some embodiments, the smart security lights 100a-100n may be configured to send and/or generate notifications to a user that provides the user with an identification of the visitor (e.g., based on the signal AUTH and/or the signal AUTH'). For example, the signal AUTH may identify the visitor as one of the children of the homeowner returning home from school. The homeowner may confirm that the child has been correctly identified to provide feedback to the facial recognition and/or behavioral recognition machine learning process. For example, if the child has been incorrectly identified, the homeowner may provide negative feedback (e.g., to enable the machine learning process to adjust parameters that may be used for a next pass in response to the error) and the smart security lights 100a-100n may take further action (e.g., perform a security response for an unidentified visitor on the premises 202a).

In some embodiments, based on the absence of the owner authenticated signal AUTH, one or more of the smart security lights 100a-100n may enable/disable various sensors and/or features (e.g., an image sensor and/or other input/output modules). In an example, one or more of the smart security lights 100a-100n may disable notifications when the signal AUTH is detected (e.g., the absence of the signal AUTH may enable notifications and/or video recording). In some embodiments, based on the owner authenticated signal AUTH', one or more of the smart security lights 100a-100n may disable various sensors and/or features (e.g., an image sensor and/or other input/output modules). In another example, a characteristic of the signal AUTH' detected by one or more of the smart security lights 100a-100n (e.g., a pre-determined threshold value) may disable notifications (e.g., when the signal AUTH' is a pre-determined distance away, notifications and/or video recording may be disabled). The signal AUTH' may provide a distance between one or more of the smart security lights 100a-100n and one or more of the smartphones 220a-220n. The response by the smart security lights 100a-100n in response to the signal AUTH and/or the signal AUTH' may be varied according to the design criteria of a particular implementation.

Figure 4:
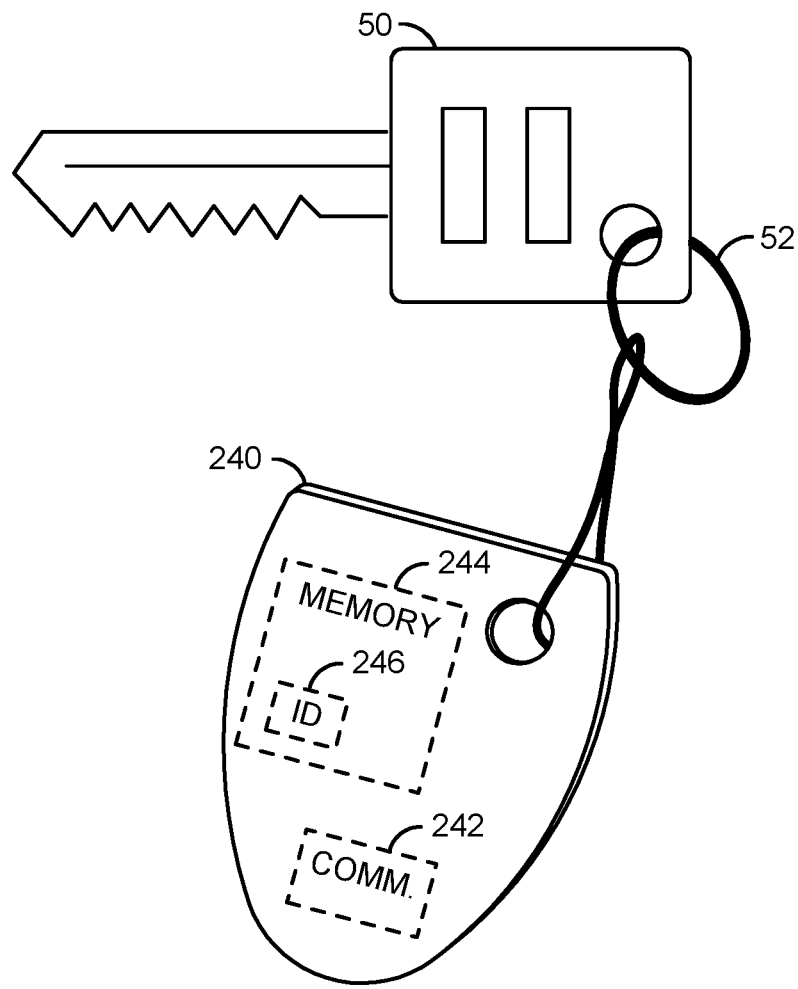
FIG. 4 is a diagram illustrating an identification device configured to communicate with a smart security light.

Referring to FIG. 4, a diagram illustrating an identification device 240 configured to communicate with one or more of the smart security lights 100a-100n is shown. The wireless ID device 240 is shown attached to the key 50 and the keychain 52. The wireless ID device 240 may generally be implemented as a small, portable object (e.g., something that may be carried by the user at all times). In an example, the wireless ID device 240 may be attached to a purse, a belt loop, a pocket, clothing, school bags, equipment bags, etc. Generally, the wireless ID device 240 may be connected to an item the user commonly leaves home with. The size, shape, color, and/or accessories used with the wireless ID device 240 may be varied according to the design criteria of a particular implementation.

The wireless ID device 240 may comprise a block (or circuit) 242 and/or a block (or circuit) 244. The circuit 242 may be a communication device. The circuit 244 may be a memory. The wireless ID device 240 may comprise other components (not shown). For example, the wireless ID device 240 may comprise a battery. The wireless ID device 240 may be a self-powered device. In another example, the wireless ID device 240 may optionally comprise a button (e.g., to initiate a pairing with one or more of the smart security lights 100a-100n). The components of the wireless ID device 240 may be varied according to the design criteria of a particular implementation.

The communication device 242 may be configured to communicate with one or more of the smart security lights 100a-100n. In some embodiments, the communication device 242 may be configured to communicate with the internet 210. The communication device 242 may implement a communications protocol configured to implement short-range, low-power, wireless communication. In one example, the communication protocol implemented by the communication device 242 may be a Bluetooth Low Energy (BLE) protocol (e.g., the signal AUTH may be a Bluetooth signal). In another example, the communication protocol implemented by the communication device 242 may be a Wi-Fi protocol. In yet another example, the communication protocol implemented by the communication device 242 may be a ZigBee protocol. Generally, the protocol implemented by the communication device 242 may be compatible with one or more of the communication protocols implemented by the communication module 162 of the smart security cameras 100a-100n. The communication protocol implemented by the communication device 242 may be varied according to the design criteria of a particular implementation.

The communication device 242 may be configured to generate the signal AUTH. The communication device 242 may be configured to receive data from one or more of the smart security lights 100a-100n. In an example, the smart security lights 100a-100n may be configured to communicate a device ID (e.g., a MAC address, a product identification number, an identification code stored in the database 218, etc.) to identify a particular one of the smart security lights 100a-100n and/or pair one or more of the smart security lights 100a-100n with the wireless ID device 240.

The memory 244 may store data. The memory 244 may comprise a block (or circuit or module) 246. The block 246 may be an ID block. The ID block 246 may store data corresponding to an identification of the user. In an example, the ID block 246 may be implemented to associate the user with the signal AUTH transmitted by the wireless ID device 240. The smart security lights 100a-100n may check the data from the ID block 246 to ensure that the user is a known visitor (or the homeowner). The data in the ID block 246 may associate a particular user with the authentication signal AUTH (e.g., the ID block 246 may enable an individualized authentication signal).

One or more of the smart security lights 100a-100n may be configured to check the data from the ID block 246 with data stored in the database 218 (or the memory 154 of the smart security lights 100a-100n). The database 218 (or the memory 154) may store identification information about the user (e.g., facial recognition data, relationship to the homeowner, behavioral patterns, movement patterns, etc.) and/or user preferences (e.g., notification settings, video data uploading settings, etc.). The data in the ID block 246 may be used by the smart security lights 100a-100n to associate the identification of the user with the corresponding data in the database 218 (or the memory 154). In an example, data from the ID block 246 may be a code word and/or a hash. The hash may be checked against the database 218 (or the memory 154) and the database 218 (or the memory 154) may store a greater amount of information.

Many different people (or pets) may have the wireless ID device 240 that may be recognized by the smart security lights 100a-100n. Each user may have different data in the ID block 246 to help the smart security lights 100a-100n distinguish between known visitors (e.g., expected visitors, friendly visitors and/or unfriendly visitors). In some embodiments, the database 218 (or the memory 154) may associate a different set of components of the smart security lights 100a-100n to enable/disable based on the different data stored in the ID block 246. In an example, the data in the ID block 246 may identify a person as the homeowner and the homeowner may have selected settings to prevent uploading the video data to the internet 210 when the homeowner is detected. In another example, the data in the ID block 246 may identify a person as the child of the homeowner and the homeowner may have selected settings to upload the video data of the child. In yet another example, the data in the ID block 246 may identify a person as a domestic worker and the homeowner may have selected settings to upload the video data and send a notification to the homeowner. In some embodiments, the data in the ID block 246 may be used to associate the user with a person on the 'whitelist' (e.g., a list of approved visitors) stored in the database 218.

In some embodiments, the smart security lights 100a-100n and/or the database 218 may group users based on the data in the ID block 246. The smart security lights 100a-100n may be configured to enable/disable components the same way for each user in the group. In an example, one group may be 'friends' and when any wireless ID device 240 that corresponds to the users in the 'friends' group is detected by one of the smart security lights 100a-100n then a pre-recorded audio message may be played. In another example, one group may be 'domestic workers', and when any wireless ID device 240 that corresponds to the users in the 'domestic workers' group is detected by one of the smart security lights 100a-100n then a notification may be sent to the homeowner. Some users may be associated with more than one group. Generally, the combination of the components of the smart security lights 100a-100n that may be enabled/disabled by the signal AUTH may be assigned to each user and/or user group. The number of groups and the responses by the smart security lights 100a-100n to the groups may be varied according to the design criteria of a particular implementation.

Each user may receive one or more notifications based on the settings selected, the schedule and/or based on the data from the ID block 246. For example, the notification may be sent to one of the user devices 220a-220n. In one example, the notification may be that a family member has arrived home. In another example, the notification may be that a package has been delivered. In a further example, the notification may be that authorities 214 have been alerted due to a burglar on the premises. The particular notification may be varied to meet the design criteria of a particular implementation. Each user may set up a particular notification type corresponding to the scale of urgency. Set up of notifications may be implemented through the web interface 216 and/or an app implemented for the user devices 220a-220n.

In some embodiments, the data from the ID block 246 may determine which of the users (e.g., which of the user devices 220a-220n) to contact first. In one example, if one of the smart security lights 100a-100n determine the detected person in the area of interest is a child based on the data from the ID block 246 then one or more of the parents of the child may be contacted first. In another example, if one of the smart security lights 100a-100n determine the detected person in the area of interest is a domestic worker based on the data from the ID block 246 then a household member that deals with the domestic workers may be contacted first. In yet another example, if one of the smart security lights 100a-100n determine the detected person in the area of interest is a friend of a particular family member based on the data from the ID block 246 then the household member that is friends with the visitor may be contacted first.

Figure 5:
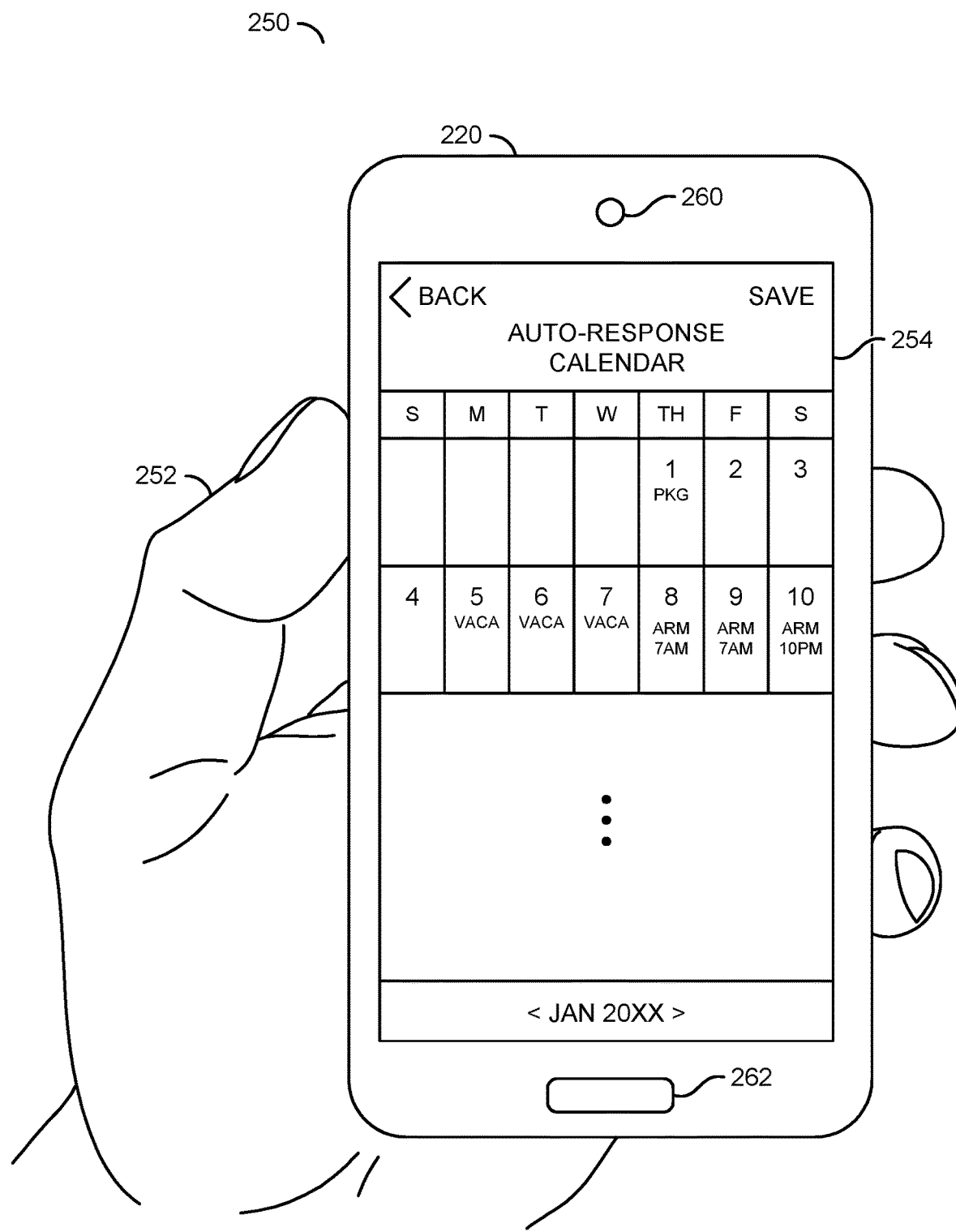
FIG. 5 is a diagram illustrating an example smartphone timing system input.

Referring to FIG. 5, a diagram illustrating an example smartphone timing system input 250 is shown. The user 252 is shown holding the smartphone 220. A display interface 254 is shown on the smartphone 220. The smartphone 220 is shown comprising a speaker 260 and a microphone 262 (e.g., implemented to receive notifications and/or provide 2-way communication with the smart security light 100). The display interface 254 may be a timing input for the smart security light. In an example, the timing input 254 may implement a user-configurable calendar. The user-configurable calendar may be implemented as an electronic calendar stored in the memory 154. In some embodiments, the electronic calendar may be stored in the cloud services 210.

In some embodiments, the user interface 254 may be used to input a timing schedule. The timing schedule may control the activation state of the smart security light 100 and/or one or more of the security responses. The control signals may be generated in response to the schedule. For example, the schedule may indicate times and/or dates to activate and/or deactivate the light bulb 106 (e.g., a dusk-to-dawn mode). In some embodiments, the control signals may be generated in response to the schedule and a random value. For example, the schedule may be configured to turn on the light bulb 106 at 7 pm, and the random value may add or subtract a maximum value of 5 minutes to the scheduled time to allow the light bulb 106 to be activated at any time between 7:55 pm and 8:05 pm. The random value may be implemented to provide the appearance that the light bulb 106 is being controlled by a person instead of a schedule. The schedule may be customizable via the user interface 254 (e.g., different patterns on weekdays and weekends).

The smart security light 100 may automatically arm/disarm "automatic greetings" (e.g., one of the security responses). The security responses that are armed may be dependent on a particular activation state (e.g., at work, on vacation, sleeping, etc.). In an example, the calendar-based tool 254 may be used to determine when the "automatic greetings" feature should be turned on (e.g., armed) or turned off (e.g., disarmed). In an example, during a high traffic and/or low risk time, the security responses may be turned off. In another example, the security responses may be armed during vacation, at night, and/or during work hours when no one is expected to be home.

The calendar interface 254 is shown displaying days of a month. In the example shown, on the 1st of the example month displayed, a package may be expected (e.g., the security responses of the security light 100 may be armed for a package delivery). In the example shown, from the 5th to the 7th of the example month displayed, the user 252 may be on vacation (e.g., security responses corresponding to a vacation status may be armed). In the example shown, on the 8th and 9th of the example month displayed, the smart security light 100 may be armed starting when the user 252 leaves for work (e.g., 7 AM). In the example shown, on the 9th of the example month displayed, the security light 100 may be armed starting when the user 252 is expected to go out for the night (e.g., 10 PM). The types of security responses and the activation states may be varied according to the design criteria of a particular implementation.

The smart security light 100 may implement automatic greetings as one of the security responses to minimize an annoyance to "friendly visitors" and/or prevent excessive notifications being sent to the user 252. The smart security light 100 may provide an effective deterrence to "unfriendly visitors". The smart security light 100 may implement various features to reduce an annoyance and/or improve benefits associated with the security responses (e.g., the automatic greetings).

In some embodiments, the smart security light 100 may implement one or more sensors and/or implement machine learning to turn off the security responses when "friendly visitors" are detected. In an example, the "friendly visitors" may be people who frequently enter the home (e.g., family members, domestic helpers, close friends, pre-approved visitors, etc.). In one example, the sensors may comprise the IR sensor 166. In some embodiments, the processor 152 may be configured to implement the machine learning and/or perform the video analysis for distinguishing different types of visitors. In some embodiments, the processor 152 may be configured to send (via the communications module 162a-162b) captured video data to the cloud services 210 and the cloud services 210 may perform the machine learning and/or the video analysis for distinguishing different types of visitors (e.g., the computer executable instructions implemented by the processor 152 may have an API for receiving data from the cloud services 210). In some embodiments, the machine learning and/or video analysis for distinguishing different types of visitors may be implemented by a combination of the cloud services 210 and the processor 152. The implementation of the machine learning and/or the video analysis for distinguishing different types of visitors may be varied according to the design criteria of a particular implementation The smart security light 100 may be configured to perform a classification (e.g., distinguish various types of the visitors). For example, the smart security light 100 may implement computer vision, PIR sensors, machine learning, detection of wireless ID signals (e.g., from a smartphone, from RFID devices, from smart tags, from Bluetooth signals, etc.) and/or to classify the visitors. In some embodiments, the visitors may be classified as potential burglars trying to find out if anyone is home, delivery people, solicitors, package thieves, residents (e.g., recognized by the wireless ID signals), domestic helpers (e.g., recognized by the wireless ID signals), emergency responders, neighbors etc. The number and/or types of classifications may be varied according to the design criteria of a particular implementation.

The video analysis may be performed by the processor 152 and/or distributed processing implemented using the cloud services 210. The video analysis may comprise analyzing visual information in one or more of the video frames of the captured video data. Analyzing the visual information at a video frame level may comprise scanning pixels and/or groups of pixels to detect shapes, patterns and/or colors. Shapes, patterns and/or colors may be tracked over time from frame to frame in a sequence of video frames. By analyzing the visual information, the processor 152 (and/or the cloud services 210) may be configured to aggregate data in order to perceive the video data and/or make inferences from video data similar to how a person may perceive the video data (e.g., identify a particular region of a video frame as a person, identify a particular color, track the movement of a person over a series of video frames, etc.).

In some embodiments, video data captured by the smart security cameras 100a-100n may be analyzed to determine a behavior and/or identity of a visitor. Based on the video analysis (e.g., facial recognition, object detection, object classification, etc.) and/or behavioral analysis, the smart security cameras 100a-100n may determine whether a visitor is a friendly visitor (e.g., a known, a welcome and/or whitelisted visitor) and/or an unfriendly visitor (e.g., an unknown, an undesired and/or blacklisted visitor). For example, the pixels comprising each video frame may be analyzed and/or compared to reference objects and/or templates (or feature maps) to identify, classify and/or recognize objects. For example, video data in the video frames may be compared to templates of known objects to classify portions of captured video frames as a particular type of object. In an example, facial recognition may be implemented to compare an object classified as a face of a person with stored data corresponding to previously stored faces. In some embodiments, the facial recognition may be performed locally by the smart security cameras 100a-100n. In some embodiments, video may be uploaded to the internet/cloud services 210 to enable distributed computing resources to perform facial recognition.

In some embodiments, the smart security cameras 100a-100n may combine multiple sensory signals to accurately characterize the behavior of a visitor. The smart security cameras 100a-100n may be configured to enable sensor and/or data fusion. For example, the smart security cameras 100a-100n may be configured to receive data from one or more (e.g., disparate) sources (e.g., the signals AUTH and/or AUTH', microphone 164, an IR sensor 166, the camera sensor 150, etc.). The smart security cameras 100a-100n may combine and/or analyze the data from the different sources to make inferences about the area of interest. The inferences made by the smart security cameras 100a-100n may provide a greater accuracy and/or precision of data (e.g., visitor detection, facial recognition, behavior classification, etc.) than using one of the sources of data alone.

Characterization of the behavior of the visitor may be performed and/or presented to home/business owners in real time. For example, categorizations of the behavior of visitors may comprise the behavior typical of potential burglars, solicitors, delivery workers, residents, domestic helpers, strangers, friendly visitors with and/or without access to the premises, etc. The number and/or type of behavior categorizations may be varied according to the design criteria of a particular implementation.

Different types of behavior by a visitor may have a different impact on the type of visitor classification. For example, a visitor touching the doorknob may result in a small increase to an urgency level. In another example, a visitor detected at two different access points of the premises may result in a large increase to the urgency level (e.g., checking multiple entrances may indicate a burglar is trying to enter the premises). Notifications may be sent and/or other event responses may be initiated based on the urgency level. Heuristics may be used and/or assumptions may be made when monitoring behavior of a visitor. For example, if the visitor stays at the access point (e.g., the front door) for more than 10 seconds an assumption may be made that the visitor has rung the doorbell and/or knocked on the door. The heuristics used and/or the assumptions made may be used to adjust the urgency level.

In some embodiments, a combination of video analysis techniques (e.g., object recognition and/or behavior recognition) may be implemented by the smart security lights 100a-100n. A shape of an object and/or a color of an object may be analyzed and/or used as sources of data to recognize an object and/or behavior. A sequence of movements and/or a round trip time may be analyzed and/or used as sources of data to recognize an object and/or behavior. Combining the shape, color, sequence of movements and/or round trip time may provide more data to make inferences about the event.

In one example, a visitor may be detected approaching a front door, and a sequence of motions may indicate a behavior of placing something in a mailbox. A notification may be sent to the homeowner 252 that an item has been delivered, but not enough information may be available for the processor 152 to recognize and/or identify the event (e.g., the delivery could be the daily mail, a solicitor dropping off an advertisement, a parcel delivery, a newspaper, etc.). In another example, the processor 152 may perform the video analysis of the video frames to detect colors (e.g., the visitor may be wearing a blue uniform), to detect a shape (e.g., analysis of the pixels may identify that the visitor is carrying a mailbag), to detect the sequence of motions (e.g., an arm movement up towards the wall-mounted mailbox) and/or to detect the round trip time (e.g., 10 seconds total time at the front door and the visitor leaves).

In the example, the blue uniform, and the mailbag along with the movement pattern and short round trip time may be used to infer that the visitor was a mail delivery person. Additional inferences may be made based on a time of day of the event. For example, the mail delivery person may have a routine and deliver the mail between 10 am and 2 pm. In another example, a parcel delivery service may deliver after 3 pm while wearing a brown uniform. The user 252 may have different notification settings for receiving a mail (e.g., a common occurrence) compared to receiving a parcel delivery (e.g., a less common occurrence and/or a high value item being delivered). The type of data combinations used to make inferences and/or the inferences performed using the video analysis may be varied according to the design criteria of a particular implementation.

The smart security light 100 may implement customized pre-recorded messages. In an example, the memory 154 may store the pre-recorded messages. In another example, the communications module 154 may stream pre-recorded messages (e.g., from the smartphone 220 and/or the cloud service 210). The speaker 174 may play the pre-recorded messages. The pre-recorded messages may be one of the security responses.

The user 252 may select from several choices of pre-recorded messages for each type of visitor. The deterrence effect may be one or more of "nothing", a comment in a "nice tone" and "several minutes of loud sirens" (e.g., an alarm). One example of a deterrence message for a potential burglar may be: "Hi Mary and Paul are busy. Please speak and leave a message with your phone number, you are being recorded by a monitoring service. Bye bye". After the security response is performed, the smart security light 100 may monitor a reaction (e.g., a behavior) of the visitor to the security response. In an example, if the visitor is still in the area of interest after 40 seconds an additional security response may be performed (e.g., sound siren for 20 seconds). In another example, a message for a package delivery person may be: "Please leave the package at the right corner in front of the door for the camera to see. If you need a signature, please ring the doorbell and I will be right there. Thanks". The type and/or content of the pre-recorded messages may be varied according to the design criteria of a particular implementation.

In some embodiments, the smart security light 100 may implement security responses and/or deterrents against package thieves. In an example, the storage bag 230 may be implemented for the delivered packages and the smart security light 100 may use the pre-recorded message to ask the delivery person to put the packages inside the storage bag 230. The storage bag 230 may be secured by bolting the storage bag 230 to the wall and/or tied to the storage bag 230 to the door of the home 202a. Once the bag 230 is closed and/or locked, a wireless signal from the wireless device 232 may be sent to the smart security light 100 and put the smart security light 100 in a "packages delivered alert state".

One of the security responses may be activating an automatic alarm signal (e.g., a notification) when the visitor is still detected after the pre-recorded messages is completed. The user 252 may have the automatic alarm signal notification sent to one or more designated people (e.g., a notification sent to one or more of the smartphones 220a-220n). In an example, the notification may be sent to a professional monitoring service, the user 252 and/or a volunteer who may engage with the visitor (e.g., a neighbor, the authorities 214, etc.).

The user 252 may set up an option to automatically receive visitors at the door. In one example, the smart security light 100 may be configured to deter a potential burglar who is looking for an easy target home with no one inside the house 202. When the smart security light 100 classifies the visitor as a potential burglar the speaker 174 may announce "Hi Mary and Paul are busy. Please speak and leave a message with your phone number, you are being recorded by a monitoring service. Bye bye." (e.g., play the pre-recorded security response). If the visitor is still detected after a pre-determined amount of time (e.g., 40 seconds), the additional security response may be activated (e.g., activating a siren for 20 seconds). If the visitor is still there after the siren, an automatic alarm signal may be sent (e.g., the notification security response) to a designated person to engage with the visitor (e.g., the authorities 214).

In another example, the smart security light 100 may be configured to deter a potential package thief who sees a package at the door front of a house 202. When the smart security light 100 classifies the visitor as a delivery person that has delivered a package, the smart security light 100 may enter a "packages delivered alert state". In the "packages delivered alert state", for anyone detected by the smart security light 100 as approaching the door (e.g., the zone 234), a pre-recorded message may be played (e.g., "Do not touch the packages, you are being recorded. We will find you. A loud siren will start in 10 seconds"). If the visitor is still in the zone 234, the smart security light 100 may send an automatic alarm signal (e.g., the notification security response) to one or more of the designated people to engage with this visitor.

The smart security light 100 may prevent two common types of crimes (e.g., package thefts and home burglaries). Because these two crimes are not considered serious (or urgent) and happen millions of times every year, the police force cannot afford to deal with them. Implementing the security light 100 may prevent billions of dollars of property thefts when widely deployed to over 20% of households. The smart security light 100 further provides peace of mind to homeowners.

In some embodiments, the smart security lights 100a-100n may be activated in response to a visitor detected at another one of the houses 202a-202n. In an example, the smart security lights 100a-100n of one of the homes 202a-202n may provide a better view of a visitor and/or an additional angle to provide more information to the authorities 214 (e.g., a thief may be recorded escaping the scene of a crime and running through a number of the backyards of the homes 202a-202n). For example, the smart security lights 100a-100n installed at the multiple homes 202a-202n may implement a smart neighborhood watch.

In some embodiments, the video analysis may detect particular visitors and/or characteristics of the visitors and the smart security light 100 may respond (e.g., enter a particular activation state, over-ride an activation state and/or arm/disarm one or more of the security responses). In an example, if a weapon (e.g., a gun, a knife, a bat, etc.) is detected, the notification security response may be activated regardless of the activation state of the smart security light 100. In another example, if fire is detected, the authorities 214 may be alerted (e.g., the fire department). In yet another example, if blood is detected, the authorities 214 may be alerted (e.g., the police and/or an ambulance). In still another example, if a particular type of uniform and/or ID (e.g., a police badge) is detected, the user 252 may receive the notification security response.

In some embodiments, the wireless ID device 240 (or one of the smartphones 220a-220n) may be configured to implement an override for the schedule. The signal AUTH (or AUTH') may be configured as a manual override for the schedule. The smart security devices 100a-100n may be configured to be armed (or disarmed) based on the schedule. When one or more of the smart security devices 100a-100n detect the wireless ID device 240, the preferences (e.g., the security responses being armed and/or disarmed) of the user associated with the ID block 246 detected may be used instead of the preferences set according to the schedule. When the wireless ID device 240 is no longer detected, the smart security devices 100a-100n may revert back to the preferences set according to the schedule. The wireless ID device 240 may implement a temporary change in security responses for the smart security devices 100a-100n.

In the example shown, on the 5th to the 6th of the example month displayed, the schedule may implement vacation security response settings (e.g., high alert for burglars). If a visitor approaches the premises 202 during the vacation security response settings, the security response may comprise a request to leave, a stern request to leave, an alarm and bright flashing light and then a call to the authorities 214. The homeowner on vacation may approve a visitor to enter the premises 202 while on vacation (e.g., a family member or neighbor may be asked to check on and feed a pet, or check the mail, etc.). The visitor may have the wireless ID device 240. When the wireless ID device 240 is detected (e.g., the signal AUTH is detected), the smart security lights 100a-100n may check the ID block 246 and determine the visitor is a friendly visitor. The security response preferences for the visitor with the wireless ID device 240 may be settings for a pre-approved guest. For example, since the guest is a friendly visitor permitted in the home to feed a pet, the smart security lights 100a-100n may unlock one or more of the access points 204a-204n to enable entry into the premises 202 (e.g., the homeowner may not need to lend a key or hide a key on the property to allow entrance). Since the visitor is a guest entering an unoccupied home, the smart security lights 100a-100n may be configured to record video of the visitor (e.g., to prevent theft). When the visitor leaves the premises 202 and the signal AUTH is no longer detected by the smart security cameras 100a-100n, the smart security cameras 100a-100n may revert back to the vacation security response settings.

Figure 6:
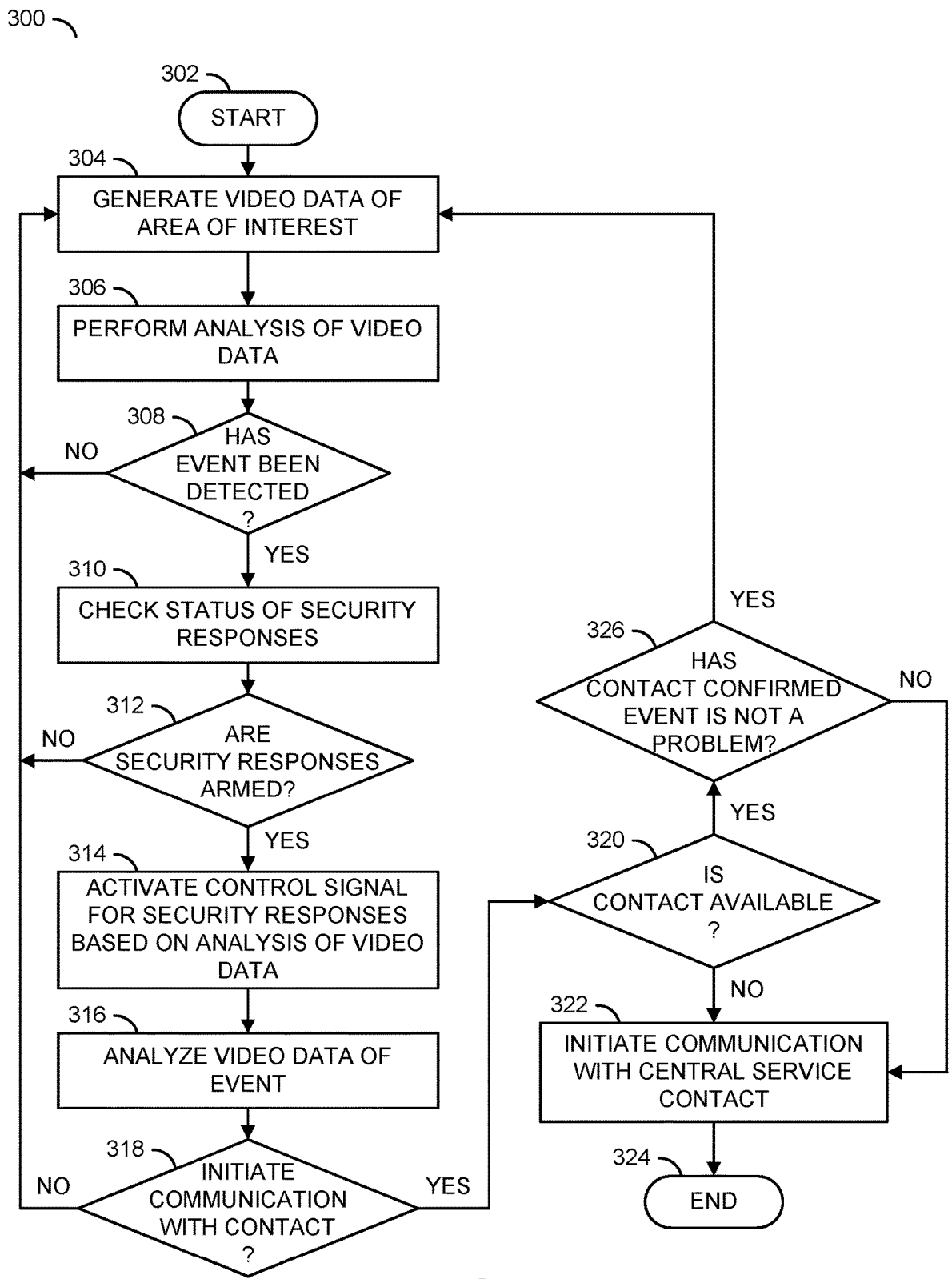
FIG. 6 is a flow diagram illustrating a method for reducing false alarms using video data and communicating with contacts.

Referring to FIG. 6, a method (or process) 300 is shown. The method 300 may reduce false alarms using video data and communicating with contacts. The method 300 generally comprises a step (or state) 302, a step (or state) 304, a step (or state) 306, a decision step (or state) 308, a step (or state) 310, a decision step (or state) 312, a step (or state) 314, a step (or state) 316, a decision step (or state) 318, a decision step (or state) 320, a step (or state) 322, a step (or state) 324, and a decision step (or state) 326.

The state 302 may start the method 300. Next, in the state 304, the camera sensor 150 and/or the processor 152 may generate video data of the area of interest (e.g., the front porch of the home 202a). In the state 306, the processor 152 may perform analysis of the video data. In some embodiments, the analysis of the video data may be performed locally (e.g., by the processor 152). In some embodiments, the analysis of the video data may be performed using distributed computing resources available from the cloud services 210. For example, the video data captured by the smart security lights 100a-100n may be uploaded to the cloud services 210 for the video analysis and the results of the video analysis may be transmitted back to the smart security lights 100a-100n and/or the results may be communicated to the user devices 220a-220n. Next, the method 300 may move to the decision state 308.

In the decision state 308, the processor 152 (and/or the cloud services 210) may determine whether an event has been detected. If an event has not been detected, the method 300 may return to the state 304. If an event has been detected, the method 300 may move to the state 310. In the state 310, the processor 152 may check the status of the security responses. Next, the method 300 may move to the decision state 312. In the decision state 312, the processor 152 may determine whether the security responses are armed. If not, the method 300 may return to the state 304. If the security responses are armed (e.g., based on the calendar settings, based on the ID data 246, etc.), the method 300 may move to the state 314.

In the state 314, the processor 152 may activate one or more of the control signals for the security responses based on the analysis of the video data. In one example, the security response may be playing the pre-recorded audio message to the visitor. In another example, the security response may be to cause the indicator LEDs 124a-124b to glow red to indicate that video is being recorded. Next, the method 300 may move to the state 316. In the state 316, the processor 152 and/or the cloud services 210 may analyze the video data of the event (e.g., to determine the behavior of the visitor). Next, the method 300 may move to the decision state 318. In the decision state 318, the processor 152 and/or the cloud services 210 may determine whether to initiate communication with the contact (e.g., the homeowner 252). If the processor 152 determines not to initiate communication, the method 300 may return to the state 304. For example, the visitor may leave in response to the audio recording security response and no further action may be needed. If the processor 152 and/or the cloud services 210 determines communication should be initiated with the contact, the method 300 may move to the decision state 320.

In the decision state 320, the communication module 162 may determine whether the contact is available. If the contact is not available (e.g., the user devices 220a-220n do not respond to the communication within a pre-determined amount of time), the method 320 may move to the state 322. In the state 322, the communication module 162 may initiate communication with an alternate contact. For example, the alternate contact may be the central monitoring service receptionist 212 and/or the authorities 214. Next, the method 300 may move to the state 324. The state 324 may end the method 300. In the decision state 320, if the contact is available, the method 300 may move to the decision state 326. In the decision state 326, the processor 152 may determine whether the contact has confirmed that the event is a not a problem. For example, if the homeowner 252 indicates that the visitor is a friend, then the visitor may not be a problem. In another example, if the event is not a problem, then the event may be a false alarm. If the event is not a problem, then the method 300 may return to the state 304. If the event is a problem, then the method 300 may move to the state 322.

In some embodiments, if the first contact (e.g., the homeowner 252) is not available, the smart security light 100 may contact the central monitoring service 212 and/or attempt to communicate with another verified contact (e.g., a friend, a neighbor, a volunteer, etc.). The first contact may be unavailable because the communication attempted by the smart security light 100 may be unsuccessful. For example, the communication may be unsuccessful if the homeowner 252 does not pick up the phone, if the homeowner 252 fails to respond within a pre-determined amount of time (e.g., within 2 minutes), if the notification failed to be sent over the network 210, etc. The central monitoring service contact 212 may intervene to ensure that the potential event detected by the smart security light 100 does not get missed and/or ignored when the first contact does not respond.

In some embodiments, the first contact (e.g., the homeowner 252) may confirm whether or not the event detected by the smart security light 100 is a problem (e.g., a bad event). In an example, the smart security light 100 may detect a loiterer and send a notification to the first contact. The homeowner 252 may view the video of the event and see that the loiterer is a friend visiting. The homeowner 252 may confirm that the event detected is not a problem and the central monitoring service 212 and/or the authorities 214 do not need to be contacted. In another example, the homeowner 252 may view the video of the event and see that the loiterer is a suspicious person. The smart security light 100 and/or the application on the smartphone 220 may initiate communication with the central monitoring service 212 and/or the authorities 214. Having the first contact confirm the event before contacting the authorities 214 may prevent and/or reduce false alarms.

Figure 7:
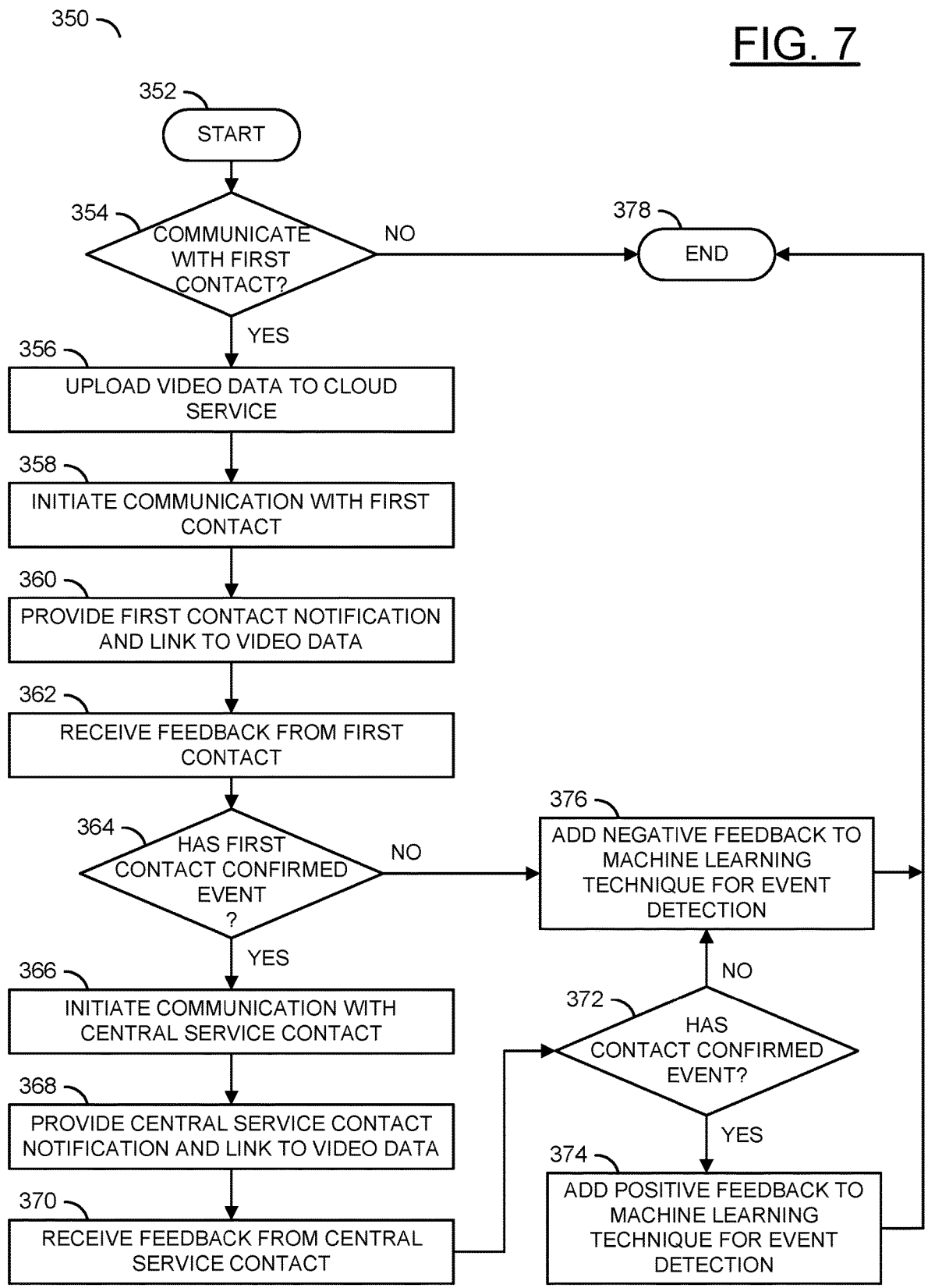
FIG. 7 is a flow diagram illustrating a method for confirming an event using video data and/or machine learning.

Referring to FIG. 7, a method (or process) 350 is shown. The method 350 may confirm an event using video data and/or machine learning. The method 350 generally comprises a step (or state) 352, a decision step (or state) 354, a step (or state) 356, a step (or state) 358, a step (or state) 360, a step (or state) 362, a decision step (or state) 364, a step (or state) 366, a step (or state) 368, a step (or state) 370, a decision step (or state) 372, a step (or state) 374, a step (or state) 376, and a step (or state) 378.

The state 352 may start the method 350. Next, the method 350 may move to the decision state 354. In the decision state 354, the processor 152 and/or the cloud services 210 may determine whether or not to communicate with the first contact (e.g., the homeowner 252). If not communicating with the first contact, the method 350 may move to the state 378. If communicating with the first contact, the method 350 may move to the state 356. In the state 356, the communication module 162 may upload the video data to the cloud service 210. Next, in the state 358, the communication module 162 may initiate communication with the first contact (e.g., a text message, a push notification to the user device 220, an alert, etc.). In the state 360, the communication module 162 may provide the first contact the notification and/or a link to the video data (e.g., a URL to the location that the video data is stored on the cloud service 210). Next, in the state 362, the processor 152 may receive feedback from the first contact. Next, the method 350 may move to the decision state 364.

In the decision state 364, the processor 152 may determine whether the first contact has confirmed the event. For example, the homeowner 252 may interact with user devices 220a-220n (e.g., press a confirm button on a touchscreen interface) to confirm the event. If the user has not confirmed the event, the method 350 may move to the state 376. If the user has confirmed the event (e.g., the homeowner 252 indicates that a loiterer is an unwanted visitor and/or a burglar is breaking into the home), the method 350 may move to the state 366. In the state 366, the communication module 162 may initiate communication with the central service contact (e.g., the receptionist 212). Next, in the state 368, the communication module 162 may provide the central service contact 212 a notification and/or a link to the video data (e.g., the video data may be stored using the cloud services 210). In the state 370, the processor 152 may receive feedback from the central service contact 212. In an example, the central service contact 212 may view the video data and make a determination about whether the event is a potential problem (e.g., a burglar entering the house, a package being stolen, etc.). Next, the method 350 may move to the decision state 372.

In the decision state 372, the processor 152 and/or the cloud service 210 (e.g., a device managing the machine learning), may determine whether the contact has confirmed the event. If the central service contact has confirmed the event, the method 350 may move to the state 374. In the state 374, the processor 152 may add the positive feedback to the machine learning technique for the event detection (e.g., scaling factors for the machine learning technique may be adjusted based on the correct solution). Next, the method 350 may move to the state 378. In the decision state 372, if the central service contact has not confirmed the event, the method 350 may move to the state 376. In the state 376, the processor 152 may add the negative feedback to the machine learning technique for the event detection (e.g., the scaling factors for the machine learning technique may be adjusted based on the incorrect solution). Next, the method 350 may move to the state 378. The state 378 may end the method 350.

Figure 8:
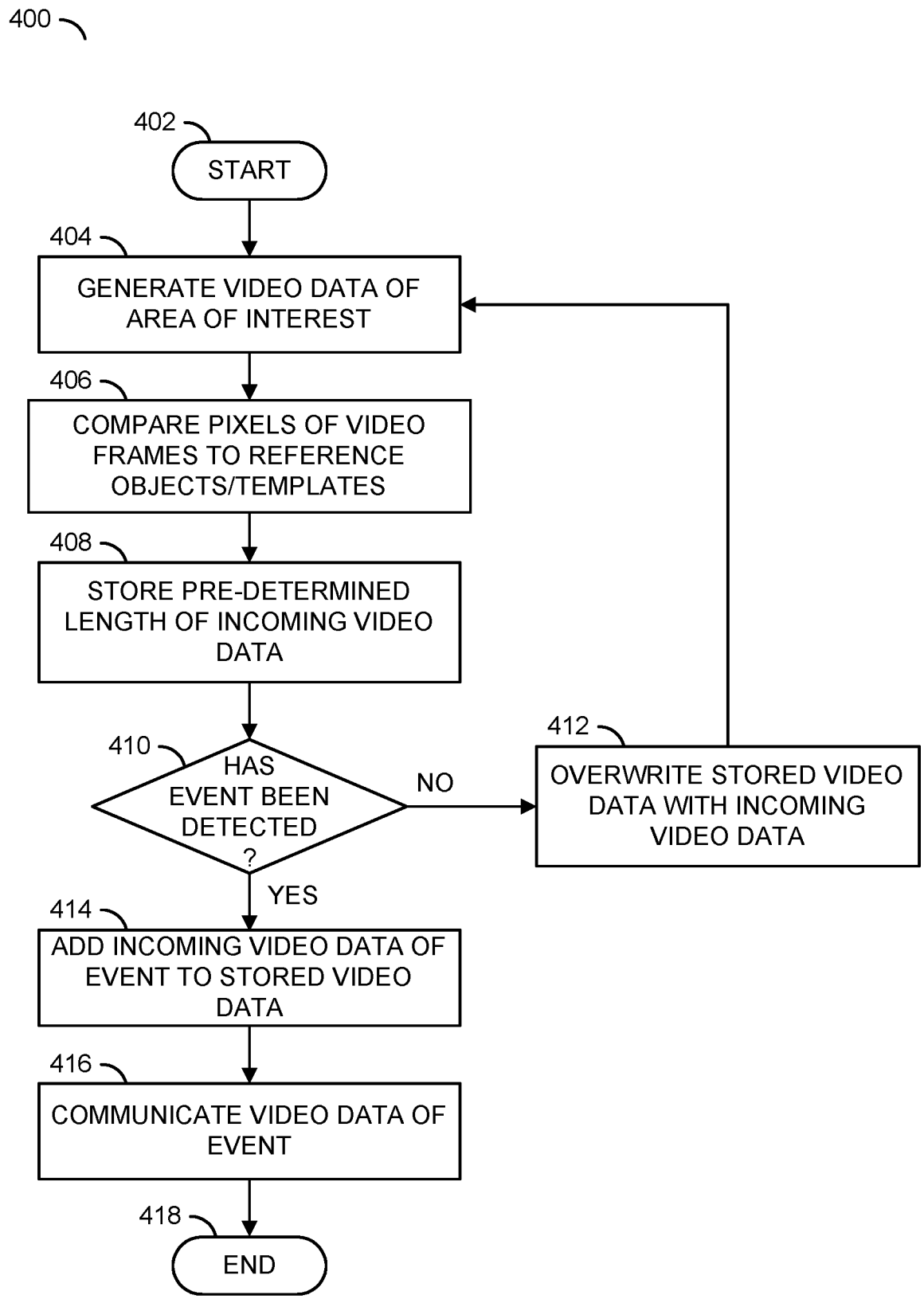
FIG. 8 is a flow diagram illustrating a method for recording loops of video data to provide additional context.

Referring to FIG. 8, a method (or process) 400 is shown. The method 400 may record loops of video data to provide additional context. The method 400 generally comprises a step (or state) 402, a step (or state) 404, a step (or state) 406, a step (or state) 408, a decision step (or state) 410, a step (or state) 412, a step (or state) 414, a step (or state) 416, and a step (or state) 418.

The state 402 may start the method 400. In the state 404, the camera sensor 150 and/or the processor 152 may generate video data of the area of interest. Next, in the state 406, the processor 152 (or the distributed processing of the cloud services 210) may compare pixels of the video frames of the video data to reference objects and/or templates. Comparing pixels to reference objects and/or templates may be used to perform object detection (e.g., recognizing a person as a particular person) and/or behavior detection (e.g., recognizing the movements of a person and/or patterns of movement as a particular action, such as theft and/or burglary). In the state 408, the memory 154 (and/or the storage provided by the cloud services 210) may store a pre-determined length of incoming video data. For example, the pre-determined length of video data may be an amount (e.g., running time and/or file size) of video data that may provide pre-padding in case an event occurs. The pre-padding may provide context to the event to help prevent potentially important information from being missed. For example, a person exiting a vehicle parked on the street may not be considered an event, but the person may attempt to break into the home. Without the pre-padding video data showing the person leaving the vehicle may provide additional evidence of what car the criminal was driving. Next, the method 400 may move to the decision state 410.

In the decision state 410, the processor 152 and/or the processing provided by the cloud services 210 may determine whether an event has been detected. If an event has not been detected, the method 400 may move to the state 412. In the state 412, the processor 152 may over-write previously stored video data with incoming video data (e.g., implement a loop recording). Next, the method 400 may return to the state 404. In the decision state 410, if the event has been detected, the method 400 may move to the state 414. In the state 414, the processor 152 may add the incoming video data of the event to the stored video data. For example, the memory 154 and/or the storage provided by the cloud service 210 may provide long-term storage for video data that corresponds to an event. For example, video data that corresponds to an event may not be over-written by the loop recording (e.g., to preserve as evidence and/or make available for later review). Next, in the state 416, the communication module 162 may communicate the video data of the event (e.g., to one or more contacts). Next, the method 400 may move to the state 418. The state 418 may end the method 400.

Figure 9:
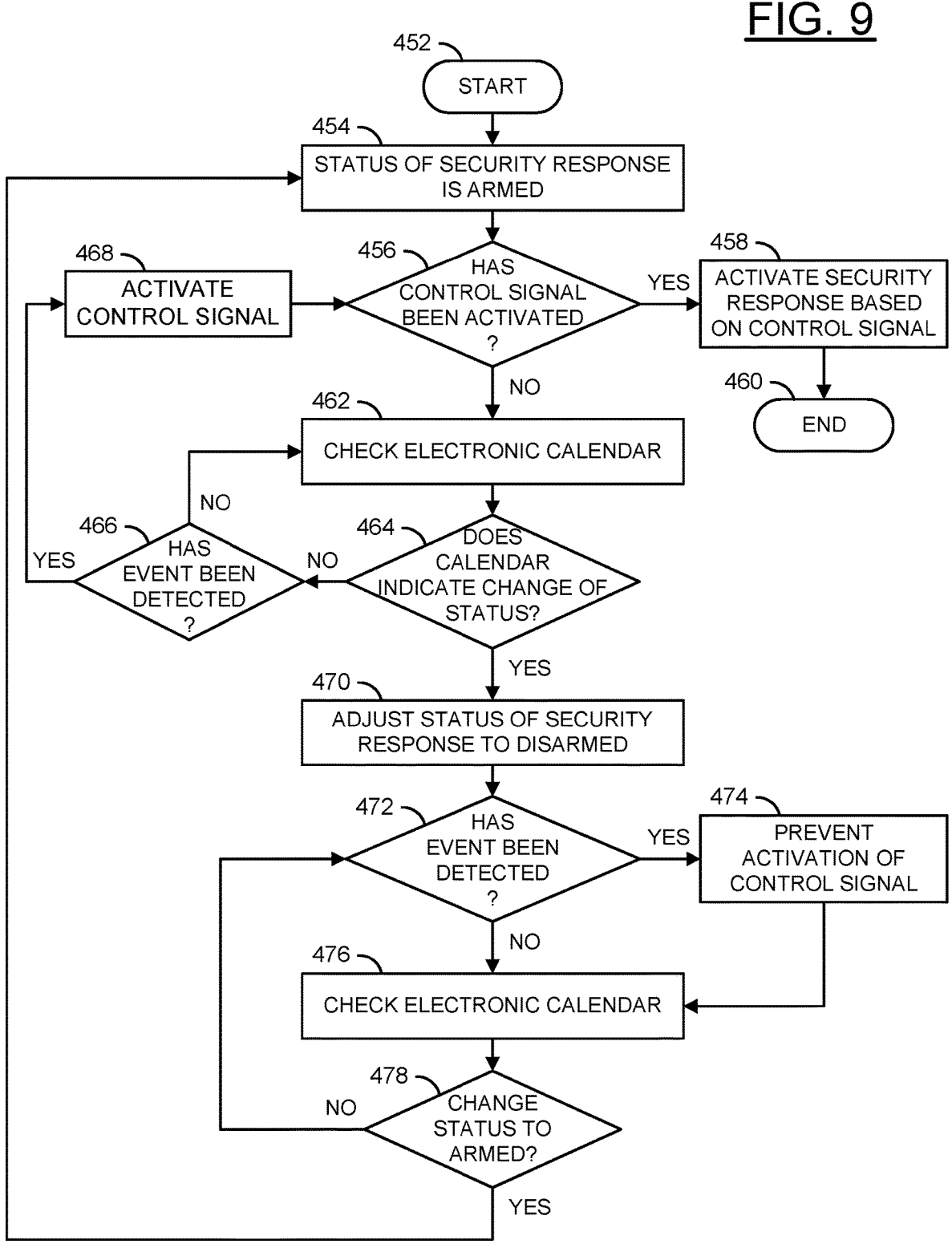
FIG. 9 is a flow diagram illustrating a method for controlling the status of security responses using an electronic calendar.

Referring to FIG. 9, a method (or process) 450 is shown. The method 450 may control the status of security responses using an electronic calendar. The method 450 generally comprises a step (or state) 452, a step (or state) 454, a decision step (or state) 456, a step (or state) 458, a step (or state) 460, a step (or state) 462, a decision step (or state) 464, a decision step (or state) 466, a step (or state) 468, a step (or state) 470, a decision step (or state) 472, a step (or state) 474, a step (or state) 476, and a decision step (or state) 478.

The state 452 may start the method 450. In the state 454, the status of the security responses for the smart security light 100 may be armed. Next, the method 450 may move to the decision state 456. In the decision state 456 the processor 456 may determine whether one or more of the control signals have been activated. If the control signals have been activated, the method 450 may move to the state 458. In the state 458, the smart security light 100 may activate one or more of the security responses based on the control signal.

Next, the method 450 may move to the state 460. The state 460 may end the method 450.

In the decision state 456, if the control signals have not been activated, the method 450 may move to the state 462. In the state 462, the processor 152 and/or the cloud services 210 may check the electronic calendar. Next, the method 450 may move to the decision state 464. In the decision state 464, the processor 152 and/or the cloud services 210 may determine whether the calendar indicates a change of status (e.g., a security response change from armed to disarmed). If there is no change of status, the method 450 may move to the decision state 466. In the decision state 466, the processor 152 and/or the cloud services 210 may determine whether an event has been detected (e.g., by analyzing the video data and/or data from other sensors of the smart security lights 100a-100n). If no event has been detected, the method 450 may return to the state 462. If an event has been detected, the method 450 may move to the state 468. In the state 468, the processor 152 may activate one or more of the control signals (e.g., signals for activating the various security responses). Next, the method 450 may return to the decision state 456.

In the decision state 464, if there is a change of status, the method 450 may move to the state 470. In the state 470, the processor 152 may adjust the status of the security responses for the smart security lights 100a-100n to disarmed. Next, the method 450 may move to the decision state 472. In the decision state 472, the processor 152 and/or the processing performed by the cloud services 210 may determine whether an event has been detected (e.g., by analyzing the video data). If no event has been detected, the method 450 may move to the state 476. If an event has been detected, the method 450 may move to the state 474. In the state 474, the processor 152 may prevent the activation of the control signal. For example, the disarmed status of the smart security lights 100a-100n may override the generation of the control signals for security responses when an event is detected. Overriding the generation of the control signals (e.g., in response to the electronic calendar) may provide automatic arming and/or disarming of security features for homeowners without manually entering a security code. Next, the method 450 may move to the state 476.

In the state 476, the processor 152 may check the electronic calendar (e.g., check if the armed/disarmed status changes for a particular time and/or date such as for a vacation, weekend settings, weekday settings, etc.). Next, the method 450 may move to the decision state 478. In the decision state 478, the processor 152 may determine whether the status of the security responses has been changed to armed. If the status of the security responses has not changed to armed, the method 450 may return to the decision state 472. If the status of the security responses has changed to armed, the method 450 may return to the state 454.

Figure 10:
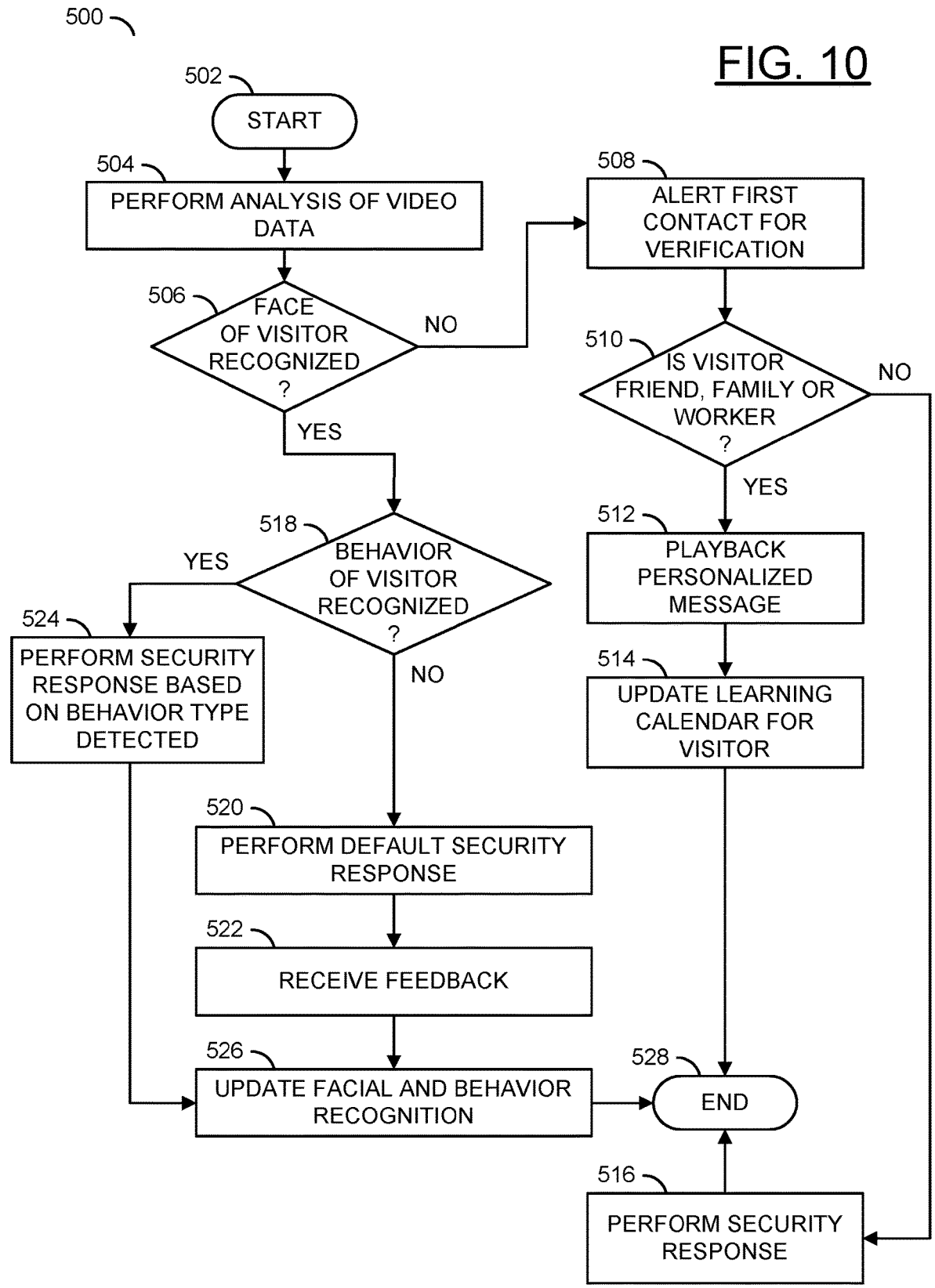
FIG. 10 is a flow diagram illustrating a method for performing face and/or behavior recognition.

Referring to FIG. 10, a method (or process) 500 is shown. The method 500 may perform face and/or behavior recognition. The method 500 generally comprises a step (or state) 502, a step (or state) 504, a decision step (or state) 506, a step (or state) 508, a decision step (or state) 510, a step (or state) 512, a step (or state) 514, a step (or state) 516, a decision step (or state) 518, a step (or state) 520, a step (or state) 522, a step (or state) 524, a step (or state) 526, and a step (or state) 528.

The state 502 may start the method 500. In the state 504, the processor 152 and/or the processing provided by the cloud services 210 may perform analysis of the captured video data. Next, the method 500 may move to the decision state 506. In the state 506, the processor 152 and/or the processing provided by the cloud services 210 may determine whether the face of the visitor is recognized (e.g., whether the visitor may be identified as a particular person). If the face is not recognized, the method 500 may move to the state 508.

In the state 508, the communication module 162 may alert the first contact to verify the event. Next, the method 500 may move to the decision state 510. In the decision state 510, the processor 152 may determine whether the visitor is a friend, family member, delivery person and/or domestic worker (e.g., a welcome visitor). For example, the confirmation provided by the first contact may determine whether or not the visitor is welcome. If the visitor is welcome, the method 500 may move to the state 512. In the state 512, the speaker 174 may playback a personalized message (e.g., "Welcome back [insert name of friend]!"). Next, in the state 514, the processor 152 and/or the cloud services 210 may update the learning calendar for the visitor. For example, the learning calendar may be configured to automatically adjust an arm/disarm status of the smart security light 100 based on the habits that have been learned. For example, a child may return home from school at 4:00 pm every weekday from September until the end of June and the learning calendar may adjust the schedule when the habits change in July and August when there is no school. Next, the method 500 may move to the state 528.

In the decision state 510, if the visitor is not welcome, the method 500 may move to the state 516. In the state 516, the smart security light may perform one or more security responses (e.g., sound an alarm). Next, the method 500 may move to the state 528.

In the decision state 506, if the face is recognized, the method 500 may move to the decision state 518. In the decision state 518, the processor 152 and/or the processing provided by the cloud services 210 may determine whether the behavior of the visitor is recognized. For example, the behavior may be a delivery person dropping off a package, a burglar breaking and entering, a family member opening the door with a key, etc. If the behavior is recognized, the method 500 may move to the state 524. In the state 524, the smart security light 100 may perform one or more security responses based on the behavior type detected (e.g., an alarm if a burglar is breaking in, a message telling a loiterer to move along, etc.). Next, the method 500 may move to the state 526.

In the decision state 518, if the behavior of the visitor is not recognized (e.g., the processor 152 is unable to classify the behavior as a known type of behavior), the method 500 may move to the state 520. In the state 520, the smart security light 100 may perform a default security response. For example, a default security response may be to activate the light bulb 106. In another example, the default security response may be to play an audio message to state that the area is being recorded. In yet another example, the default security response may be to contact the homeowner 252 and/or the receptionist 212 to let a person decide what the behavior is. Next, in the state 522, the processor 152 and/or the cloud services 210 may receive feedback. For example, the feedback may be further video analysis that determines the behavior. In another example, the feedback may be a response from the contact that identifies the visitor and/or identifies what the behavior is. In the state 526, the processor 152 and/or the cloud services 210 may update the facial recognition and/or behavior recognition in response to the feedback. Next, the method 500 may move to the state 528. The state 528 may end the method 500.

In some embodiments, the smart security light 100 may be configured to deter "loiterers". For example, a loiterer on the premises may be undesirable. In another example, a loiterer on the premises may be a burglar attempting to look for a way to break in to the home and/or looking for valuables (e.g., casing the property). In one example, the calendar interface 254 may be used to arm/disarm the security responses. In another example, the geolocation (e.g., to identify the smartphone 220) may be implemented to arm/disarm the security responses. In yet another example, the identification device 240 may be implemented to arm/disarm the security responses.

The smart security light 100 may be configured to monitor the area of interest using the captured video data. For example, the video data may be analyzed to detect objects (e.g., people, animals, property, etc.). A "loiterer" may be detected if the visitor is detected for a pre-determined amount of time (e.g., more than 20 seconds). In one example, the user 252 may use an application on the smartphone 220 to select the pre-determined amount of time for a visitor to be considered a loiterer. In another example, the pre-determined amount of time for a visitor to be considered a loiterer may be a pre-configured value (e.g., based on studies of break-ins). The amount of time before a visitor may be considered a loiterer may be varied according to the design criteria of a particular implementation.

The detection of the loiterer may be considered a detected event. The smart security light 100 may be configured to continually record a pre-determined amount of video data. If no event has been detected, the smart security light 100 may discard the recorded data (e.g., over-write the video data with new video data). For example, the smart security light 100 may have the last 10 seconds of footage stored, with new recorded video data over-writing the oldest recorded video data. If an event has been detected, the smart security light 100 may keep the previously recorded data (e.g., not over-write the video data) and continue to record the video data of the event. For example, if the video loop stored by the smart security light 100 is 10 seconds long, and an event is detected, the 10 seconds may be kept and additional video may be recorded and stored for the event (e.g., the recording of the event may be longer than 10 seconds). Similarly, each of the additional cameras (e.g., the smart security lights 100a-100n) may also keep the pre-determined length of video (e.g., the 10 second video loop) and additional footage captured during the event when one of the cameras 100a-100n detects the event.

Storing the video loop (e.g., the pre-determined length of video data) may provide additional context about an event. For example, if a loiterer is detected after 20 seconds, and recording is not started until the visitor is determined to be a loiterer, the recorded data may not capture the visitor arriving. In another example, if the video loop is stored, the smart security light 100 may provide additional evidence (e.g., the loiterer arriving, what the loiterer did while approaching the home, etc.). Using the other smart security lights 100a-100n may provide additional evidence from different viewpoints and/or at different times during the event. The pre-determined length for the video loop may be varied according to the design criteria of a particular implementation.

When the smart security light 100 determines a loiterer has been detected, the security responses may be activated based on the arm/disarm status. If the status of the security responses is disarmed, the smart security light 100 may not perform one or more of the security responses. For example, if the status is disarmed, the smart security light 100 may still provide storage for a detected event (e.g., a child returning home from school), but no alert may be sent. In another example, if the status is disarmed, the smart security light 100 may not record video data (e.g., a video of an employed gardener doing yard work may not be desired). If the status of the security responses is armed, the smart security light 100 may perform one or more of the security responses. The types of security responses implemented may be varied according to the design criteria of a particular implementation.

When the loiterer is detected, and the status of the security responses is armed, the smart security light 100 may implement elevated (or sequential, or tiered) responses (e.g., a first security response, determine a reaction of the loiterer to the first security response, a second security response, determine the reaction of the loiterer to the second security response, a third security response, etc.). For example, a first response may be to playback pre-recorded audio using the speaker 174 (e.g., "Hi, can I help you?"). In some embodiments, the LEDs 124a-124b may blink a red light. Since a potential criminal may be scared off if they know they are being recorded, blinking the red light may indicate to the loiterer that their image is being recording (e.g., even though the loiterer had been recorded all along).

The smart security light 100 may analyze the video data after the first security response has been performed (e.g., to determine the reaction of the loiterer to the security response). In one example, the loiterer may respond to the pre-recorded audio (e.g., indicating that they are a friend dropping by for a visit). In another example, the loiterer may flee. In yet another example, the loiterer may attempt to enter the premises. Based on the reaction of the loiterer to the security response, additional security responses may be enabled (e.g., sounding a 100 dB alarm). The smart security light 100 may implement the elevated responses until determining that communication with a contact should be initiated. The number of security responses implemented before communicating with the contact may be varied according to the design criteria of a particular implementation. For example, the homeowner 252 may use the application on the smartphone 220 to select a number of security responses to perform before communicating with the first contact.

The smart security light 100 may be configured to communicate with the first contact (e.g., the homeowner 252). Generally, the security responses performed by the smart security light 100 may deter the loiterer (or determine that the loiterer is a desired visitor). Implementing the elevated security responses may reduce the number of false alerts sent to the first contact to once per month or less. In one example, the smart security light 100 may make a phone call to the homeowner 252 (e.g., to the smartphone 220). In another example, the smart security light 100 may send a text message (e.g., SMS message) to the homeowner 252 (e.g., to the smartphone 220). In yet another example, the smart security light 100 may push a notification via the application on the smartphone 220. In still another example, the smart security light 100 may send an email to a designated email address of the contact. The type of message may be varied according to the design criteria of a particular implementation.

In some embodiments, the first contact (e.g., the homeowner 252) may provide instructions to the smart security light 100. In one example, the homeowner 252 may communicate with the loiterer by speaking into the smartphone 220 and the smart security light 100 may playback the speech of the homeowner 252 using the speaker 174. In some embodiments, the smart security light 100 may communicate with another contact based on the first communication with the homeowner 252. In one example, if the homeowner 252 does not respond, the smart security light 100 may contact an alternate contact (e.g., a neighbor, a trusted friend, the receptionist 212 etc.). In another example, if the homeowner 252 verifies (e.g., based on the recorded video data of the event) that help is needed, the smart security light 100 may contact the receptionist 212 of the home security service and/or the authorities 214. The receptionist 212 may review the recorded video data of the event and determine whether the authorities 214 should be contacted. For example, implementing the elevated security responses and communicating with the first contact before contacting the central monitoring service receptionist 212 may reduce the number of alerts sent to the central monitoring service receptionist 212 to once per year or less. Furthermore, providing the video data to the central monitoring service receptionist 212 before contacting the authorities 214 may reduce the number of false alerts sent to the authorities 214 to zero (or nearly zero).

In some embodiments, the smart security light 100 may be configured to deter package theft. For example, the "loiterer" detection described above may be modified to include "package detection". For example, the smart security light 100 may monitor the package deposit 230. Once packages are detected at the door (e.g., a signal is provided by the wireless device 232), the status of the smart security light 100 may be set to a "package alarm" state to immediately sound an alarm/siren (e.g., using the speaker 174) when a person is detected near the packages.

The smart security light 100 may be implemented to minimize the annoyance to the "friendly visitors" (e.g., receiving too many undesired notifications when events are detected). For example, the smart security light 100 may reduce a number of false "loiterer" phone calls to homeowners 252 (e.g., less than one 1 per month) by implementing multiple, automated security responses and/or the calendar system for arming/disarming the security responses. The smart security light 100 may be implemented to reduce a number of false alarms sent to the central monitoring service 212 and/or the authorities 214 (e.g., less than one per year) by implementing the multiple, automated security responses and/or contacting the homeowner 252 using video data before contacting the central monitoring service 212. Furthermore, the video data may be reviewed by the central monitoring service 212 before the authorities 214 are contacted.

The false alerts and/or false alarms may be reduced by adjusting the status (e.g., arm/disarm) of the security responses. In an example, the status of the security responses may be disarmed for gardeners, cleaning personnel and/or party guests. In some embodiments, the calendar interface 254 may be used to schedule the status of the security responses (e.g., a time and day of the week may be set for the gardener to arrive, a time may be set for the cleaning personnel, a time may be set for party guests to arrive/leave, a daily time may be set for when children arrive home from school, etc.). In another example the status of the security responses may be armed during vacations, during work hours, and/or when the home will be vacant.

In some embodiments, the status of the smart security light 100 may be armed/disarmed based on a detection of the homeowners 252. In one example, the smartphone 220 may be detected by the smart security light 100 (e.g., using geolocation, a short-range connection such as Bluetooth, etc.). In another example, the identification device 240, cards and/or tags may be detected by the smart security light 100 to determine the homeowner 252 is nearby (e.g., RFID card/tag, a Bluetooth enabled card/tag, etc.). In yet another example, the smart security light 100 may further comprise (or connect wirelessly to) a keypad. The keypad may be used to enter a pass code to arm/disarm the security responses of the smart security light 100.

In some embodiments, the smart security light 100 may be configured to implement a learning calendar. The learning calendar may be configured to learn, adapt and/or predict the schedule for adjusting the status of the security responses. For example, the video data may be processed detecting children arriving home from school at a particular time and, over time, the smart security light 100 may learn the approximate times and/or days of the week the children return home from school to disarm the security responses when the children arrive. In another example, the video data may be processed detecting domestic workers arriving to perform their services and/or leaving and the smart security light 100 may learn the schedules (e.g., days of the week) of the domestic workers to disarm the security responses and then arm the security responses when the domestic workers leave. Learning the scheduling data may allow the security responses to be armed/disarmed automatically. For example, the user 252 may not have to manually input data in the calendar application 254 to adjust the status of the security responses.

In some embodiments, the smart security light 100 may be configured to perform smart visitor categorization. In one example, the video data may be analyzed to perform facial recognition. Face data of visitors may be stored and/or uploaded to remote storage such as the cloud service 210. Repeated visitors may be recognized (e.g., friends, family, domestic workers, etc.) and the status of the security responses may be adjusted in response to the recognized visitors. In another example, the authorities 214 and/or the central monitoring service 212 may store facial data for suspicious persons (e.g., a most wanted list, known burglars, local sex offenders, etc.) in the database 218. The smart security light 100 may be configured to compare the faces detected in the video data with the face data stored in the database 218. If the detected faces in the video data match the face data for a suspicious person in the database 218, one or more security responses may be performed and/or communication with one or more of the contacts may be initiated. For example, when a violent criminal is recognized, the authorities 214 may be contacted immediately.

In some embodiments, the smart security light 100 may perform behavioral analysis to perform smart visitor categorization. For example, face data may not be available and/or the face of the visitor may be obscured in the video data (e.g., a burglar wearing a ski mask). The smart security light 100 may perform an analysis of the behavior of the visitor to determine a type of behavior to categorize the visitor. Analyzing the behavior may comprise comparing sequences of motion patterns and/or movements by a visitor, developing a behavior profile (e.g., learning the actions a person takes when attempting to break into a home to use as a template for identifying a sequence of motions that may indicate a break and enter event), monitoring the timings of various actions, analyzing the reactions of a visitor to various security responses (e.g., if they run off when an alarm is sounded, if they wave to the camera, if they respond to their name, etc.), making inferences based on a history of movements made, making inferences based on other sensor data (e.g., IR data, audio data, etc.), etc. In an example, if the visitor is holding a package, knocks on the door, puts the package in the package deposit 230 and leaves, the behavior of the visitor may indicate a delivery person. In another example, if the visitor approaches multiple doors and/or windows, the behavior of the visitor may indicate a burglar. In yet another example, if the visitor knocks on the door, waves at the camera and states the name of the homeowner 252, the behavior of the visitor may indicate a friend or neighbor.

Based on the recognized face and/or the recognized type of behavior, the smart security light 100 may implement advanced greetings. In an example, if the behavior indicates a package has been delivered, a greeting may respond thanking the delivery person for the package and/or indicating the package be left in the package deposit 230. In another example, if a face is recognized as a friend, a personalized greeting (or a prank) may be performed. In yet another example, if a domestic worker is recognized and/or arrives at an expected time, the smart security light 100 may provide a personalized greeting and/or send a signal to another smart device to unlock the home.

Machine learning may be implemented to determine the learning calendar and/or perform the smart visitor categorization. In one example, the processing to perform the learning may be implemented by the processor 152. In another example, the processing to perform the learning may be implemented by the smartphone 220. In yet another example, the processing to perform the learning may be implemented using cloud computing (e.g., a service that provides scalable processing capability based on demand). The method used to implement the machine learning may be varied according to the design criteria of a particular implementation.

The smart security light 100 may provide an improved home security implementation because of ease of use (e.g., a user friendly interface and/or install) and because the features may be designed for automation. The smart security light 100 may implement a preventative system. The preventative system (e.g., detecting burglars before they break in) may stop bad things from happening instead of providing a reactive service to clean up after the intrusion.

The detection of events based on the analysis of the video data may implement a high level of accuracy (e.g., 99%) to provide sufficient value in reducing false alarms. The type of event detection implemented may be varied according to the design criteria of a particular implementation. Providing the video data may be useful for performing automatic event detection and/or providing reviewable evidence to the homeowner 252, the receptionist 212 and/or the authorities 214. Capturing the video data as a loop of data that may be kept when an event is detected may provide images and/or video data several seconds before the person and/or event is detected to trigger additional recording. The smart security light 100 may continuously record a small (e.g., 10 seconds) loop of video data. The images (e.g., video data) from the pre-recorded loop of content may be useful to improve the accuracy of the detection and/or confirmation of the event.

The smart security light 100 may be configured to prevent the majority of the two common crimes (e.g., package thefts and home burglaries). Generally, the crimes of package theft and home burglaries are not considered serious and happen millions of times every year and the police force cannot afford to deal with them. The smart security light 100 may provide an affordable services that can deal with package thefts and/or home burglaries effectively and in a preventative manner.

The functions performed by the diagrams of FIGS. 1-10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a base of an outdoor light fixture configured to be mounted near an access point of a premises;
a camera sensor configured to generate video data of an area of interest; and
a processor implemented within said base of said outdoor light fixture to enable said processor to be configured to locally (A) analyze said video data, (B) generate control signals, (C) detect an event based on recognizing objects in said video data in response to said analysis of said video data, (D) initiate (i) a first communication to a verified person and (ii) a second communication to a second contact and (E) adjust a status of a plurality of security responses, wherein (i) said control signals are generated in response to (a) said analysis of said video data, (b) said status of said security responses, and (c) a motion sensitivity threshold, (ii) an activation of one or more of said plurality of security responses is adjusted in response to said control signals, (iii) a first of said security responses is activated in response to said event detected, (iv) said first communication is initiated based on said analysis of said video data of said event, (v) said first communication comprises presenting said video data of said event to said verified person, (vi) said second communication is prevented if said verified person confirms said event is not a problem, and (vii) said camera sensor is implemented within said base of said outdoor light fixture with said processor.

2. The apparatus according to claim 1, wherein said video data of said event is stored for verification of said event.

3. The apparatus according to claim 1, wherein said apparatus further comprises a wireless communication module configured to initiate said first communication and said second communication.

4. The apparatus according to claim 1, wherein (i) said processor is further configured to process said video data, (ii) said processing performed by said processor is configured to (a) generate video files from said video data, (b) encode said video data and (c) compress said video data and (iii) said analysis of said video data by said processor is configured to (a) recognize objects, (b) recognize patterns of movements and (c) recognize behavior.

5. The apparatus according to claim 1, wherein said analysis of said video data comprises comparing pixels of video frames of the video data to reference objects to determine whether said objects are detected in said video data.

6. The apparatus according to claim 1, wherein (i) said analysis of said video data comprises determining whether a face of a visitor is recognized and (ii) at least one of said security responses is performed based on said face.

7. The apparatus according to claim 6, wherein said face is recognized based on a comparison to faces stored in a police database.

8. The apparatus according to claim 6, wherein said verified person verifies an identity of the visitor in a response to said first communication based on said face in said video data presented in said first communication.

9. The apparatus according to claim 1, wherein said analysis of said video data comprises determining whether a behavior of a visitor is a recognized behavior.

10. The apparatus according to claim 9, wherein said recognized behavior comprises a delivery person dropping off a package, a burglar breaking and entering and a family member opening a door.

11. The apparatus according to claim 9, wherein said behavior comprises a reaction of said visitor to one or more of said security responses.

12. The apparatus according to claim 9, wherein (i) said status of said security responses is adjusted in response to said behavior of said visitor and a response to said first communication by said verified person and (ii) said behavior is compared to a sequence of motion patterns.

13. The apparatus according to claim 1, wherein (a) said status of said plurality of security responses is determined based on at least one of (i) information stored in an electronic calendar and (ii) a communication device, (b) said electronic calendar is configured to learn patterns based on detected behaviors of one or more members of a household and (c) said communication device comprises at least one of (a) a smart phone capable of providing geolocation information, (b) a Bluetooth enabled device, (c) a security keypad and (d) a radio-frequency identification device.

14. The apparatus according to claim 1, wherein (i) said event is a person determined to be loitering in said area of interest, (ii) said first of said security responses comprises at least one of (a) playing a pre-recorded message and (b) blinking a light to indicate said camera sensor is recording, (iii) said first communication comprises at least one of (a) a phone call and (b) a text message and (iv) said verified person comprises a homeowner.

15. The apparatus according to claim 14, wherein (i) a second of said security responses is performed after said first of said security responses is performed, (ii) said second of said security responses comprises sounding a siren and (iii) said second contact is a central monitoring service.

16. The apparatus according to claim 1, wherein (i) said event is a person detected in said area of interest after a package has been delivered, (ii) said first of said security responses comprises at least one of (a) playing a pre-recorded message and (b) sounding an alarm, (iii) said first communication comprises at least one of (a) a phone call and (b) a text message, (iv) said verified person comprises a homeowner and (v) said second contact is a central monitoring service.

17. The apparatus according to claim 1, wherein (i) said apparatus is configured to store a pre-determined length of said video data, (ii) if said event is not detected, said pre-determined length of said video data is discarded and (iii) if said event is detected, said pre-determined length of said video data is stored.

18. The apparatus according to claim 1, wherein (i) said analysis of said video data by said processor further comprises machine learning and (ii) said machine learning is configured to determine a behavior of a visitor.

19. The apparatus according to claim 18, wherein (i) said first of said security responses comprises an audio message and (ii) said audio message is selected based on said behavior of said visitor.

20. The apparatus according to claim 1, wherein (i) said event is detected in response to said processor recognizing one of said objects as a person, (ii) said person is detected by said processor in a field of view of said camera sensor for a pre-determined amount of time and (iii) said pre-determined amount of time is at least twenty seconds.

* * * * *